(12) United States Patent
Miyata et al.

(10) Patent No.: US 8,712,212 B2
(45) Date of Patent: Apr. 29, 2014

(54) RECORDING APPARATUS, RECORDING METHOD, REPRODUCING APPARATUS, REPRODUCING METHOD, PROGRAM, AND RECORDING/PRODUCING APPARATUS

(75) Inventors: Katsunari Miyata, Tokyo (JP); Noboru Murabayashi, Saitama (JP)

(73) Assignee: Sony Corporation, Tokyo (JP)

( * ) Notice: Subject to any disclaimer, the term of this patent is extended or adjusted under 35 U.S.C. 154(b) by 165 days.

(21) Appl. No.: 13/159,707

(22) Filed: Jun. 14, 2011

(65) Prior Publication Data

US 2012/0008920 A1 Jan. 12, 2012

(30) Foreign Application Priority Data

Jul. 7, 2010 (JP) ................................. 2010-154791

(51) Int. Cl.
*H04N 9/80* (2006.01)
*H04N 5/775* (2006.01)

(52) U.S. Cl.
USPC ......................................... 386/239; 386/326

(58) Field of Classification Search
None
See application file for complete search history.

(56) References Cited

U.S. PATENT DOCUMENTS

| | | | |
|---|---|---|---|
| 2002/0054753 A1 | 5/2002 | Kikuchi et al. | |
| 2003/0099460 A1 | 5/2003 | Imada et al. | |
| 2003/0185544 A1 | 10/2003 | Azuma | |
| 2006/0039256 A1 | 2/2006 | Nakamura et al. | |
| 2006/0126919 A1* | 6/2006 | Kitaura et al. | 382/154 |
| 2007/0074251 A1 | 3/2007 | Oguz et al. | |
| 2007/0104457 A1 | 5/2007 | Jeong et al. | |
| 2007/0133954 A1* | 6/2007 | Maeda et al. | 386/126 |
| 2008/0199156 A1 | 8/2008 | Uchiike et al. | |
| 2008/0250164 A1 | 10/2008 | Chen | |
| 2009/0147853 A1 | 6/2009 | Dane et al. | |
| 2009/0147854 A1 | 6/2009 | Dane et al. | |
| 2009/0148058 A1 | 6/2009 | Dane et al. | |
| 2009/0190662 A1 | 7/2009 | Park et al. | |
| 2010/0165077 A1 | 7/2010 | Yin et al. | |
| 2010/0202535 A1 | 8/2010 | Fang et al. | |
| 2010/0328194 A1* | 12/2010 | Inoe et al. | 345/8 |

FOREIGN PATENT DOCUMENTS

| | | |
|---|---|---|
| EP | 1 206 133 A2 | 5/2002 |
| EP | 1 206 133 A3 | 5/2002 |
| EP | 1 326 440 A2 | 7/2003 |
| EP | 1 959 683 A2 | 8/2008 |
| EP | 2 209 320 A1 | 7/2010 |
| EP | 1 938 613 B1 | 11/2010 |

(Continued)

OTHER PUBLICATIONS

Jens-Rainer Ohm, "Stereo/Multiview Video Encoding Using the MPEG Family of Standards", Proceedings of SPIE, The International Society for Optical Engineering SPIE, vol. 3639, XP 8022007, Jan. 25, 1999, pp. 242-253.

*Primary Examiner* — William C Vaughn, Jr.
*Assistant Examiner* — Asher Khan
(74) *Attorney, Agent, or Firm* — Oblon, Spivak, McClelland, Maier & Neustadt, L.L.P.

(57) ABSTRACT

A recording apparatus includes: a parallax detecting unit detecting a parallax between L and R images included in 3D contents to be recorded; and a recording control unit recording both of the L and R images at a first section at which the parallax between the L and R images is greater than a threshold value and recording one of the L and R images at a second section at which the parallax between the L and R images is less than the threshold value.

7 Claims, 19 Drawing Sheets

(56) References Cited

FOREIGN PATENT DOCUMENTS

| | | |
|---|---|---|
| JP | 2005-108282 | 4/2005 |
| JP | 2006-60630 | 3/2006 |
| JP | 2007-280493 | 10/2007 |
| WO | WO 2007/047736 A2 | 4/2007 |
| WO | WO 2009/052730 A1 | 4/2009 |

* cited by examiner (SIDE-BY-SIDE METHOD)

(TOP-AND-BOTTOM METHOD)

(SIDE-BY-SIDE METHOD)

(TOP-AND-BOTTOM METHOD)

RECORDING APPARATUS, RECORDING METHOD, REPRODUCING APPARATUS, REPRODUCING METHOD, PROGRAM, AND RECORDING/PRODUCING APPARATUS

BACKGROUND

The present disclosure relates to a recording apparatus, a recording method, a reproducing apparatus, a reproducing method, a program, and a recording/reproducing apparatus, and more particularly, to a recording apparatus, a recording method, a reproducing apparatus, a reproducing method, a program, and a recording/reproducing apparatus capable of efficiently recording 3D contents.

In recent years, 3D contents containing images that users can stereoscopically view have become popular. Image data of the 3D contents includes left-eye images (L images) and right-eye images (R images). There is a declination corresponding to a parallax between an object pictured in the L image and an object pictured in the R image.

The object can be stereoscopically recognized by users by alternately displaying the L and R images in which the parallax is set and by transmitting the L and R images to the left and right eyes of the users wearing active shutter glasses, respectively.

An example of the related art is Japanese Unexamined Patent Application Publication No. 2006-60630.

Another example of the related art is Japanese Unexamined Patent Application Publication No. 2005-108282.

Still another example of the related art is Japanese Unexamined Patent Application Publication No. 2007-280493.

SUMMARY

Apparatuses such as a BD (Blu-ray (trademark) Disc) recorder capable of recording 3D contents have been come into wide use. Transmitting 3D contents through broadcast waves can be taken into consideration. Moreover, programmed recording of 3D contents is generally executed using a recording apparatus for 3D contents.

The capacity of a recording medium mounted in a recording apparatus such as a BD, HDD (Hard Disk Drive), and SSD (Solid State Drive) has been increased. Moreover, the data amount of 3D contents is generally more than the data amount of 2D contents. Accordingly, the recording capacity becomes insufficient in many cases, compared to a case of recording 2D contents. For this reason, when the programmed recording of 3D contents is set, the programmed recording may not normally be finished for lack of the capacity of the recording medium in many cases.

A method of giving a warning for a user may be taken into consideration when the amount of 3D contents to be recorded is greater than the empty capacity of the recording medium. However, in the related art, an appropriate warning method has not been suggested. Such a warning is not necessary, as long as the 3D contents can be recorded without using up the capacity, and instead using the method of giving a warning for lack of the capacity of the recording medium. Moreover, this method is preferable in that the programmed recording can be finished normally.

It is desirable to provide a recording apparatus, a recording method, a reproducing apparatus, a reproducing method, a program, and a recording/reproducing apparatus capable of efficiently recording 3D contents.

According to a first embodiment of the present disclosure, there is provided a recording apparatus including: a parallax detecting unit detecting a parallax between L and R images included in 3D contents to be recorded; and a recording control unit recording both of the L and R images at a first section at which the parallax between the L and R images is greater than a threshold value and recording one of the L and R images at a second section at which the parallax between the L and R images is less than the threshold value.

The recording apparatus may further include an image quality detecting unit detecting image qualities of the L and R images. In this case, the recording control unit may record the image with the higher image quality between the L and R images in which the parallax is less than the threshold value.

The recording apparatus may further include a generation unit generating identification information indicating which image is recorded between the L and R images. The recording control unit may record the identification information in correspondence with image data of the second section of the 3D contents.

The generation unit may generate the identification information including information indicating the parallax between the L and R images.

The recording apparatus may further include a control unit comparing a data amount of a part, which is not recorded in the entirety of the 3D contents, to a remaining capacity of a recording medium, in which the 3D contents is recorded, and updating the threshold value so as to be higher, when the data amount of the part which is not recorded is greater than the remaining capacity of the recording medium.

According to the first embodiment of the present disclosure, there is provided a recording method including: detecting a parallax between L and R images included in 3D contents to be recorded; and recording both of the L and R images at a section at which the parallax between the L and R images is greater than a threshold value and recording one of the L and R images at a section at which the parallax between the L and R images is less than the threshold value.

According to the first embodiment of the present disclosure, there is provided a program causing a computer to execute a process including: detecting a parallax between L and R images included in 3D contents to be recorded; and recording both of the L and R images at a section at which the parallax between the L and R images is greater than a threshold value and recording one of the L and R images at a section at which the parallax between the L and R images is less than the threshold value.

According to a second embodiment of the present disclosure, there is provided a reproducing apparatus including: a reproducing unit reproducing 3D contents including a first section, at which both of L and R images are recorded, and a second section, at which one of the L and R images is recorded, depending on whether a parallax is greater than a threshold value; a generation unit generating, based on one of the L and R images of the second section obtained by reproducing the 3D contents, the other image which is not recorded as an image of the 3D contents; and a display control unit displaying the L and R images obtained by reproducing the 3D contents when displaying the images of the first section and displaying the one image obtained by reproducing the 3D contents and the other image generated by the generation unit when displaying the images of the second section.

The reproducing apparatus may further include an analysis unit analyzing identification information indicating which image is recorded between the L and R images recorded in correspondence with image data of the second section of the 3D contents. In this case, the generation unit may specify the other image which is not recorded as the image of the 3D contents based on the identification information to generate the other image.

The analysis unit may specify the parallax between the L and R images by analyzing the identification information. The generation unit may generate the other image having the parallax specified by the analysis unit with respect to the one image.

According to the second embodiment of the present disclosure, there is provided a reproducing method including: reproducing 3D contents including a first section, at which both of L and R images are recorded, and a second section, at which one of the L and R images is recorded, depending on whether a parallax is greater than a threshold value; generating, based on one of the L and R images of the second section obtained by reproducing the 3D contents, the other image which is not recorded as an image of the 3D contents; and displaying the L and R images obtained by reproducing the 3D contents when displaying the images of the first section and displaying the one image obtained by reproducing the 3D contents and the generated other image when displaying the images of the second section.

According to the second embodiment of the present disclosure, there is provided a program causing a computer to execute a process including: reproducing 3D contents including a first section, at which both of L and R images are recorded, and a second section, at which one of the L and R images is recorded, depending on whether a parallax is greater than a threshold value; generating, based on one of the L and R images of the second section obtained by reproducing the 3D contents, the other image which is not recorded as an image of the 3D contents; and displaying the L and R images obtained by reproducing the 3D contents when displaying the images of the first section and displaying the one image obtained by reproducing the 3D contents and the generated other image when displaying the images of the second section.

According to a third embodiment of the present disclosure, there is provided a recording/reproducing apparatus including: a parallax detecting unit detecting a parallax between L and R images included in 3D contents to be recorded; a recording control unit recording both of the L and R images at a first section at which the parallax between the L and R images is greater than a threshold value and recording one of the L and R images at a second section at which the parallax between the L and R images is less than the threshold value; a reproducing unit reproducing the 3D contents including the first section, at which both of the L and R images are recorded, and the second section, at which one of the L and R images is recorded, depending on whether the parallax is greater than the threshold value; a generation unit generating, based on one of the L and R images of the second section obtained by reproducing the 3D contents, the other image which is not recorded as an image of the 3D contents; and a display control unit displaying the L and R images obtained by reproducing the 3D contents when displaying the images of the first section and displaying the one image obtained by reproducing the 3D contents and the other image generated by the generation unit when displaying the images of the second section.

According to the first embodiment of the present disclosure, a parallax between L and R images included in 3D contents to be recorded is detected; both of the L and R images are recorded at a section at which the parallax between the L and R images is greater than a threshold value; and one of the L and R images is recorded at a section at which the parallax between the L and R images is less than the threshold value.

According to the second embodiment of the present disclosure, 3D contents is reproduced which includes a first section, at which both of L and R images are recorded, and a second section, at which one of the L and R images is recorded, depending on whether a parallax is greater than a threshold value. Based on one of the L and R images of the second section obtained by reproducing the 3D contents, the other image which is not recorded as an image of the 3D contents is generated. The L and R images obtained by reproducing the 3D contents are displayed when the images of the first section are displayed. The one image obtained by reproducing the 3D contents and the generated other image are displayed when the images of the second section are displayed.

According to the third embodiment of the present disclosure, a parallax between L and R images included in 3D contents to be recorded is detected. Both of the L and R images are recorded at a first section at which the parallax between the L and R images is greater than a threshold value and one of the L and R images is recorded at a second section at which the parallax between the L and R images is less than the threshold value. The 3D contents is reproduced which includes the first section, at which both of the L and R images are recorded, and the second section, at which one of the L and R images is recorded, depending on whether the parallax is greater than the threshold value. Based on one of the L and R images of the second section obtained by reproducing the 3D contents, the other image which is not recorded as an image of the 3D contents is generated. The L and R images obtained by reproducing the 3D contents are displayed when the images of the first section are displayed. The one image obtained by reproducing the 3D contents and the generated other image are displayed when the images of the second section are displayed.

According to the embodiments of the present disclosure, the 3D contents can be recorded efficiently.

DETAILED DESCRIPTION OF EMBODIMENTS

Principle of Recording/Reproducing

Figure 1:
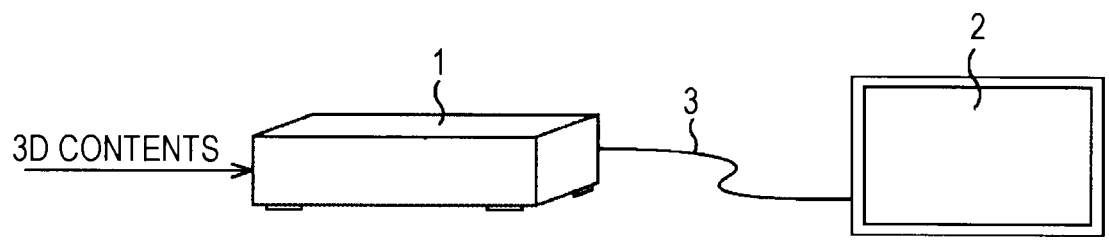
FIG. 1 is a block diagram illustrating a recording/reproducing apparatus according to an embodiment of the present disclosure.

FIG. 1 is a diagram illustrating a recording/reproducing apparatus 1 according to an embodiment of the present disclosure.

The recording/reproducing apparatus 1 is connected to a TV 2 through a cable 3 such as an HDMI (High Definition Multimedia Interface) cable. The recording/reproducing apparatus 1 is supplied with 3D contents transmitted via a network such as the Internet or broadcast waves.

The recording/reproducing apparatus 1 includes a recording medium such as a BD, an HDD, or an SSD and has a reproducing function of recording (reproducing) the 3D contents in the recording medium.

The timing of the transmission of the 3D contents such as a television program is determined on the transmission side. A user of the recording/reproducing apparatus 1 can set programmed recording by operating a remote controller or the like to execute the programmed recording of the 3D contents which starts to be transmitted at a given timing. Moreover, the user can reproduce the recorded 3D contents to watch the 3D contents on the TV 2.

Figure 2:
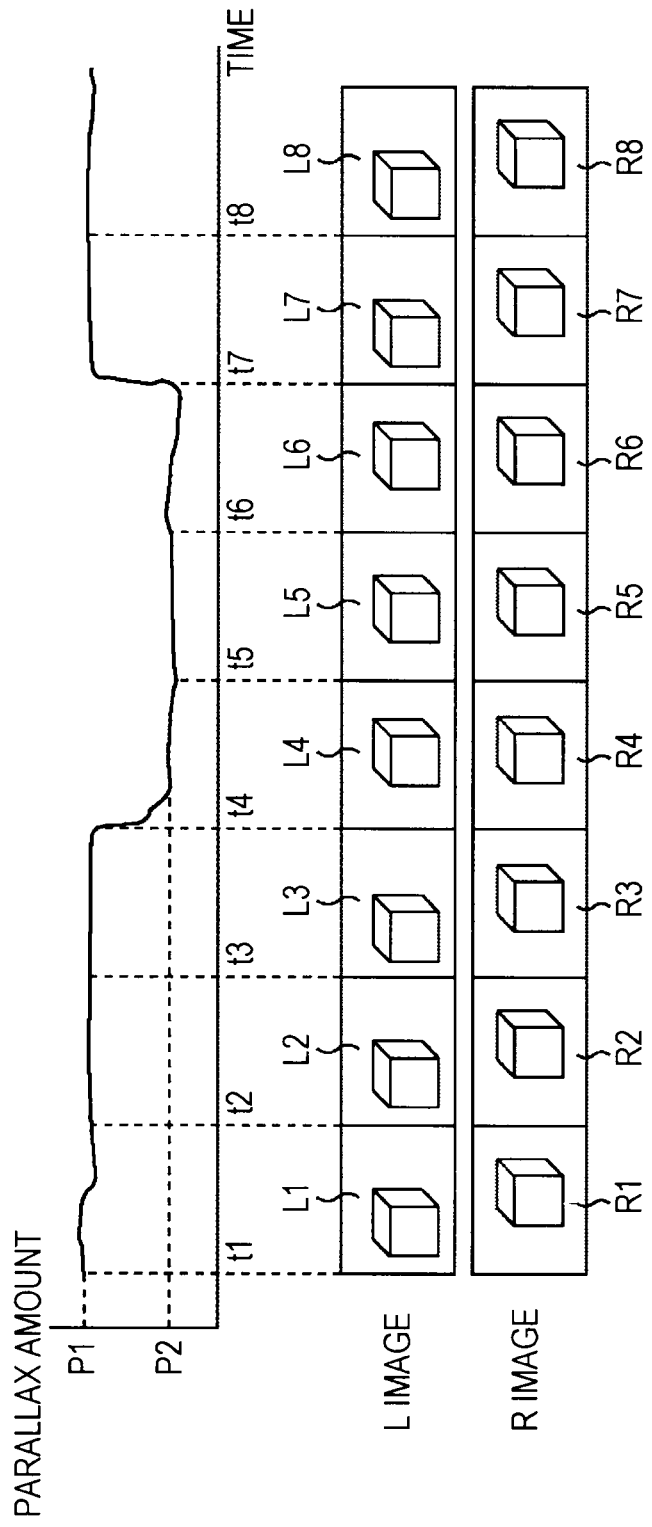
FIG. 2 is a diagram illustrating an example of image data for 3D contents.

FIG. 2 is a diagram illustrating an example of image data of the 3D contents to be recorded.

As shown in the lower part of FIG. 2, the image data of the 3D contents includes data for L images and data for R images. In FIG. 2, images L1 to L8 and images R1 to R8 are shown as the L and R images, respectively. For example, displaying a 3D image is realized by alternately displaying the L and R images in the sequence of the images L1, R1, L2, R2, L3, R3, . . . , L8, and R8. The respective R images can be displayed after the corresponding L images to which the same numbers as those of the R images are allocated.

A declination between the position of the image of an object pictured in the L image and the position of the image of an object pictured in the R image corresponding to the L image corresponds to a parallax between the L and R images (the L image and the R images corresponding thereto).

The recording/reproducing apparatus 1 detects the parallax between the L and R images when recording the 3D contents. In the upper part of FIG. 2, the detection result obtained by detecting the parallax between the L and R images shown in the lower part of FIG. 2 is chronologically shown.

In the example of FIG. 2, the parallax at sections from a time t1, at which the images L1 and R1 are displayed, to a time t4, at which the images L4 and R4 are displayed, is nearly constant as a parallax P1. Here, it is assumed that the L images and the R images corresponding thereto are displayed at the same time.

In the example of FIG. 2, the parallax at sections from a time t4 to a time t7, at which the images L7 and R7 are displayed, is nearly constant as a parallax P2 less than the parallax P1. The parallax at sections after the time t7 is nearly constant as the parallax P1.

When recording the 3D contents, the recording/reproducing apparatus 1 records both the L and R image at the section (section at which the parallax is large), at which the parallax between the L and R images is greater than a threshold value, based on the detection result of the parallax. In addition, the recording/reproducing apparatus 1 records one of the L and R images at the section (section at which the parallax is small), at which the parallax between the L and R images is less than the threshold value.

Figure 3:
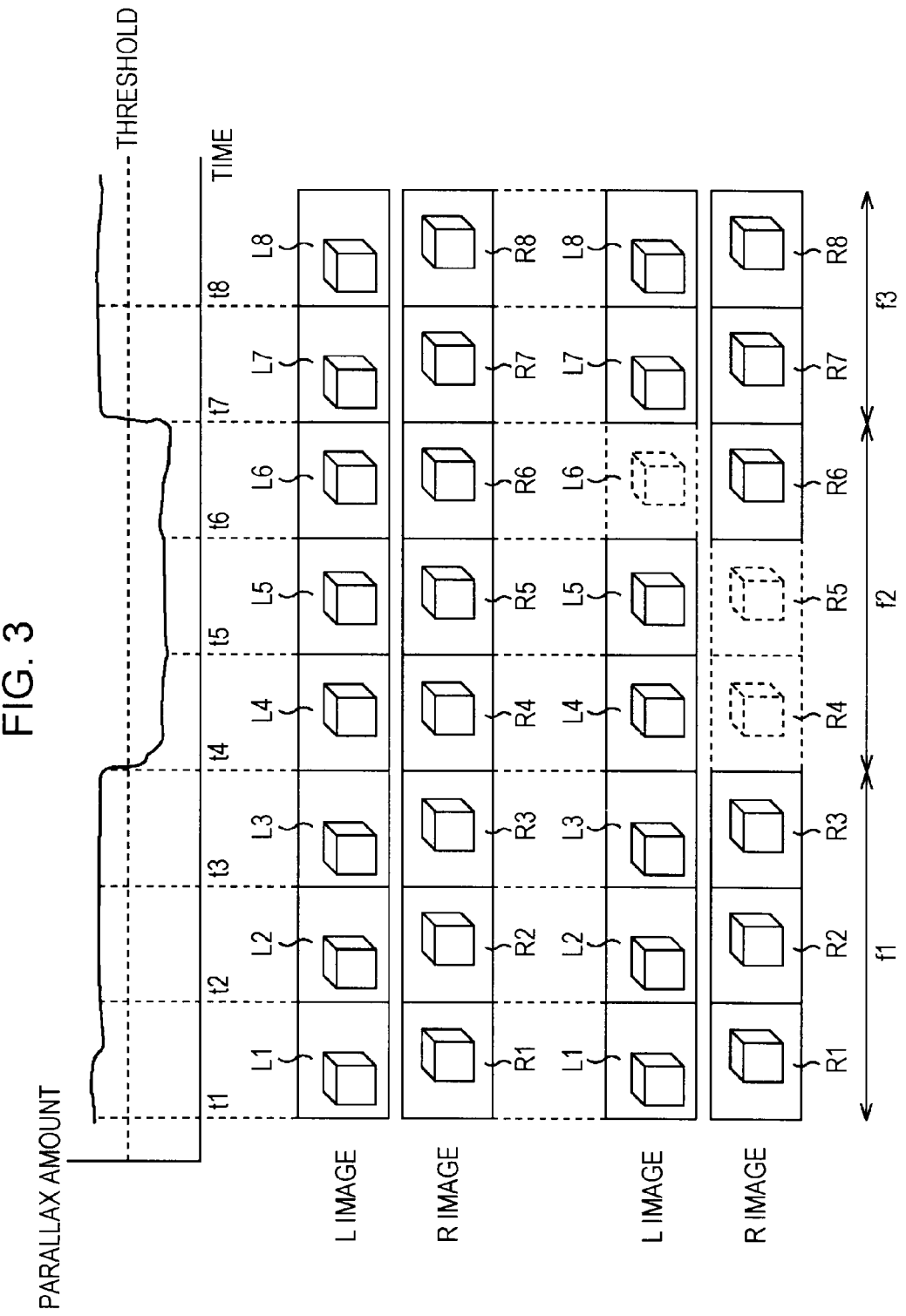
FIG. 3 is a diagram illustrating an example of a recording process of the recording/reproducing apparatus.

FIG. 3 is a diagram illustrating an example of a recording process of the recording/reproducing apparatus 1.

The chronological detection result of the parallax shown in the upper part of FIG. 3 and the images shown in the middle part of FIG. 3 are the same as those shown in FIG. 2.

As shown in the lower part of FIG. 3, both the L and R images are recorded at a section f1, at which the parallax is large, from the time t1 to the time t4 and a section f3 after the time t7.

On the other hand, one of the L and R images is recorded at a section f2, at which the parallax is small, from the time t4 to the time t7. In the lower part of FIG. 3, an image indicated by a solid line refers to an image that is recorded in the recording medium and an image indicated by a dashed line refers to an image that is not recorded in the recording medium.

In the example of FIG. 3, only L images are recorded between the images L4 and R4 and the images L5 and R5 and only the R image is recorded between the images L6 and R6 at the section f2. The image with a higher image quality is recorded between the L and R images. That is, the recording/reproducing apparatus 1 detects the image qualities of the L and R images at the section at which the parallax is small.

In the example of FIG. 3, it is assumed that the image L4 has a higher image quality between the images L4 and R4 and the image L5 has a higher image quality between the images L5 and R5. Moreover, it is assumed that the image R6 has a higher image quality between the images L6 and R6. There is a difference in the image quality, such as the amount of block noise, between the L and R images.

Thus, by recording one of the L and R images at the section at which the parallax is small, it is possible to save the capacity of the recording medium in which the 3D contents is recorded.

When reproducing the section at which the parallax is small, as described below, the recording/reproducing apparatus 1 performs 2D-3D conversion based on one image recorded between the L and R images to generate the other image which has not been recorded therebetween. By recording the image with a higher image quality, the other image which has not been recorded can be generated based on the one image with the higher image quality when the image is reproduced.

The 2D-3D conversion is performed, for example, by setting a parallax in the L or R image being recorded (displacing the position of an object). Since a higher image quality can be obtained by setting a parallax not in the image with a lower image quality but in the image with a higher image quality, the image quality of the 3D image can be improved.

By omitting not the image of the section at which the parallax is greater but the image of the section at which the parallax is small, a sense of discomfort for the 3D image being displayed in reproduction can be suppressed.

The 3D displaying process performed using the images generated through the 2D-3D conversion is a so-called pseudo displaying process and it is considered that there is a difference in a stereoscopic effect, compared to a 3D displaying process performed based on L and R images prepared in advance. By setting the section, at which the parallax is small, as a pseudo 3D display section, a difference between the original image and the image displayed at the pseudo 3D display section can be reduced as a whole, compared to a case where the section at which the parallax is large set as the pseudo 3D display section. Accordingly, the sense of discomfort can be reduced.

Hereinafter, the image which is not recorded due to the low image quality between the L and R images is referred to as an omission image. The image which is paired with the omission image and is recorded as an image of 3D contents is referred to as a recording image.

When recording the 3D contents, the recording/reproducing apparatus 1 generates identification information indicating which image is recorded between the L and R images at the section at which the parallax is small. The identification information includes information indicating which image is recorded in the L and R images and information indicating the parallax between the L and R images. The identification information is recorded in correspondence with the image data of the 3D contents.

By recording the identification information in correspondence with the image data of the 3D contents, the recording/reproducing apparatus 1 can specify the section at which the parallax is small when recording the 3D contents.

Moreover, when reproducing a specific section, the recording/reproducing apparatus 1 can determine whether to generate the omission image not recorded based on which image and can specify the parallax set in the generation of the omission image.

Figure 4:
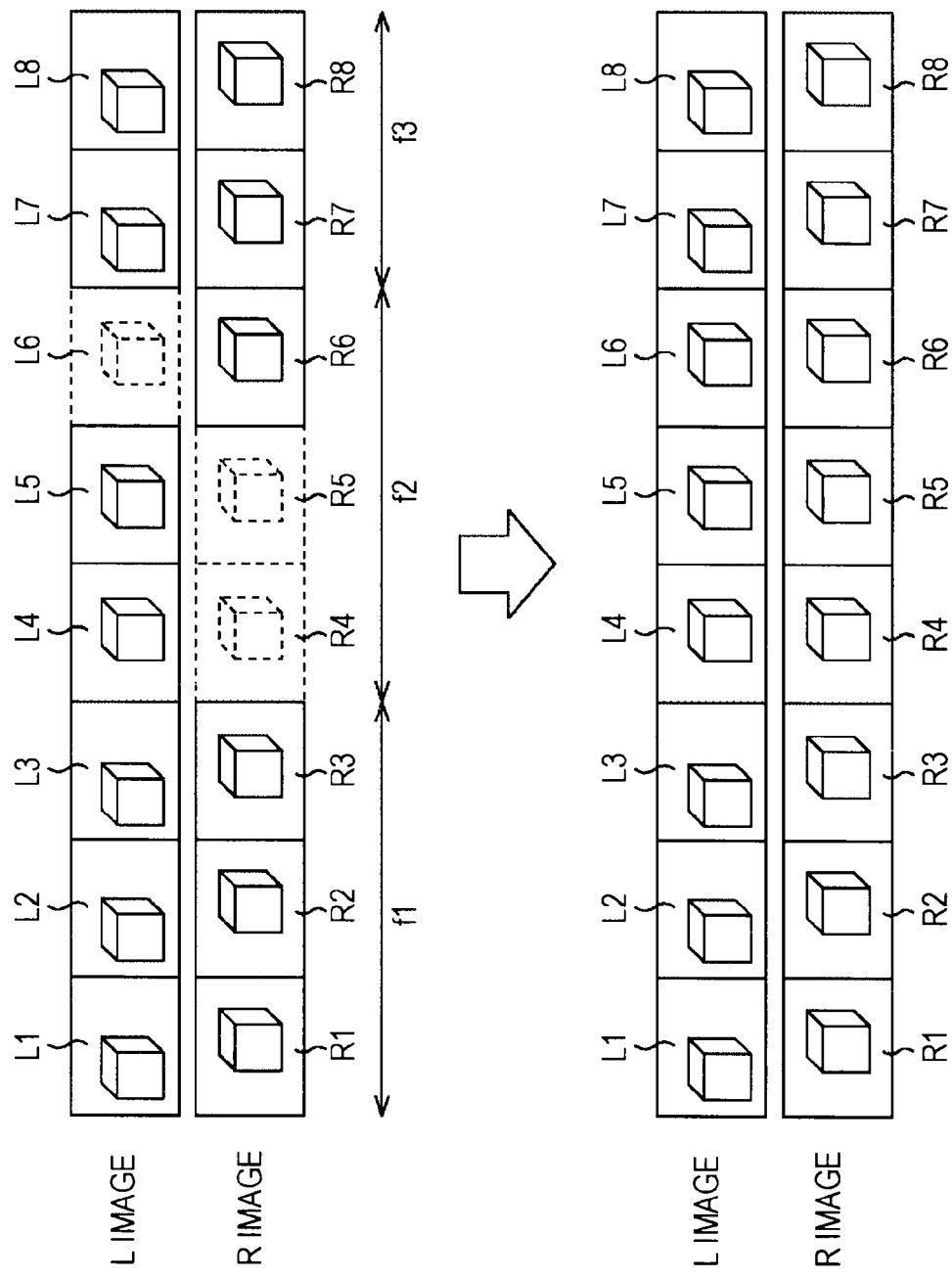
FIG. 4 is a diagram illustrating an example of a reproducing process of the recording/reproducing apparatus.

FIG. 4 is a diagram illustrating an example of a reproducing process of the recording/reproducing apparatus 1.

The images of the 3D contents completely recorded in the upper part of FIG. 4 are the same as those shown in the lower part of FIG. 3.

When reproducing the 3D contents, the recording/reproducing apparatus 1 determines whether the identification information is recorded for each image data of each section in correspondence with the image data.

When the section at which the identification information is recorded in correspondence with the image data, that is, the section at which the parallax is small is reproduced, the identification information is analyzed and it is specified which image is recorded between the L and R images. The omission image is generated by specifying the parallax used to generate the omission image and setting the parallax in the recording image.

In the example shown in the lower part of FIG. 4, the identification information is not recorded in correspondence with the image data of the section f1, when the section f1 is reproduced. Therefore, the 3D display of the section f1 is realized by displaying the recording images in the sequence of the images L1, R1, L2, R2, L3, and R3.

When the section f2 is reproduced, the identification information recorded in correspondence with the image data of the section f2 is analyzed and the parallax and which image is recorded between the L and R images are specified. The image R4 is generated based on the image L4 and the image R5 is generated based on the image L5. In addition, the image L6 is generated based on the image R6.

The 3D display of the section f2 is realized by displaying the images in the sequence of the recording image L4, the image R4 generated based on the image L4, the recording image L5, the image R5 generated based on the image L5, the image L6 generated based on the image R6, and the recording image R6.

When the section f3 is reproduced, the identification information is not recorded in correspondence with the image data of the section f3. Therefore, the 3D display of the section f3 is realized by displaying the images in the sequence of the recording images L7, R7, L8, and R8.

Configuration of Recording/Reproducing Apparatus

Figure 5:
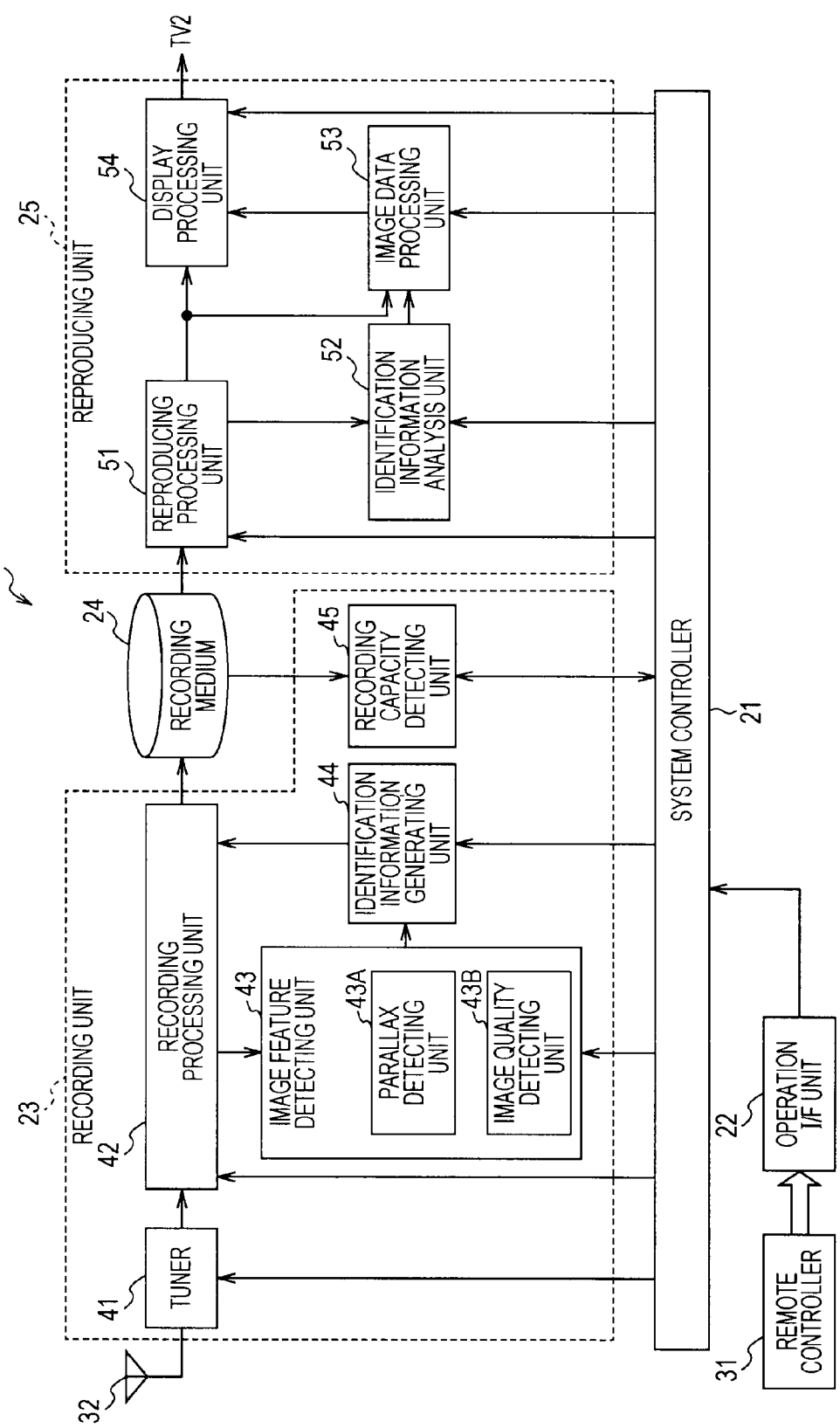
FIG. 5 is a block diagram illustrating an example of the configuration of the recording/reproducing apparatus.

FIG. 5 is a block diagram illustrating an example of the configuration of the recording/reproducing apparatus 1.

The recording/reproducing apparatus 1 includes a system controller 21, an operation I/F unit 22, a recording unit 23, a recording medium 24, and a reproducing unit 25. A signal from the remote controller 31 is supplied to the operation I/F unit 22 and a reception signal obtained when radio waves are received by an antenna 32 is supplied to a tuner 41 of the recording unit 23.

The system controller 21 executes a predetermined program and controls the entire operation of the recording/reproducing apparatus 1. For example, the system controller 21 sets programmed recording based on a signal supplied from the operation I/F unit 22 and controls the recording unit 23 to start recording of 3D contents when broadcasting starts. Moreover, the system controller 21 controls the reproducing unit 25 when receiving an instruction to reproduce the recorded 3D contents and reproduces the 3D contents recorded in the recording medium 24.

The configuration of the recording side in the recording/reproducing apparatus 1 will be described.

The recording unit 23 includes the tuner 41, a recording producing unit 42, an image feature detecting unit 43, an identification information generating unit 44, and a recording capacity detecting unit 45.

The tuner 41 demodulates the reception signal supplied from the antenna 32 and outputs data of the 3D contents obtained through the A/D conversion or the like to the recording processing unit 42. Here, processing on video data will mainly be described. However, audio data is also processed by a circuit (not shown), and then is recorded together with the video data in the recording medium 24.

The recording processing unit 42 generates image data of the 3D contents based on the data supplied from the tuner 41 and outputs the generated image data to the image feature detecting unit 43. Moreover, the recording processing unit 42 omits one image between the L and R images, which are the images of the 3D contents, based on the identification information generated by an identification information generation unit 44. The recording processing unit 42 records the remaining image together with the identification information or audio data in the recording medium 24.

The image feature detecting unit 43 includes a parallax detecting unit 43A and an image quality detecting unit 43B.

The parallax detecting unit 43A detects a parallax between the L and R images supplied from the recording processing unit 42. For example, the parallax detecting unit 43A detects the parallax in such a manner that the parallax detecting unit 43A demarcates the L and R images in each predetermined area, detects the same position of objects in the L and R images by block matching, and calculates a declination amount between the positions. The method of detecting the parallax is disclosed by, for example, Japanese Unexamined Patent Application Publication No. 7-282259, Japanese Unexamined Patent Application Publication No. 4-360395, and Japanese Unexamined Patent Application Publication No. 6-215111.

The parallax detecting unit 43A outputs information indicating the detected parallax to the identification information generating unit 44.

The image quality detecting unit 43B detects the image qualities of the L and R images supplied from the recording processing unit 42. The image qualities are detected by detecting the amount of block noise, for example, when the L and R images are encoded in accordance with a block encoding method such as MPEG. The method of detecting the block noise is disclosed by, for example, Japanese Unexamined Patent Application Publication No. 2007-266684.

In the technique disclosed by Japanese Unexamined Patent Application Publication No. 2007-266684, a pixel boundary step in a pixel boundary on an image plane of an input image frame is detected based on a difference value between pixel values of adjacent pixels in the pixel boundary and an estimated pixel value estimated from a plurality of pixels in the pixel boundary on at least one side of the pixel boundary, the pixel bound steps corresponding to one frame in the pixel boundaries are accumulated, and the block noise is detected based on the accumulation result.

The image quality detecting unit 43B outputs information indicating the image quality of the detected L and R images to the identification information generation unit 44. The processing performed by the image feature detection unit 43 may be performed only when the vacant amount of the recording medium 24 is less than the data amount of the 3D contents to be recorded.

The identification information generation unit 44 calculates the average of the parallaxes between the L and R images for every section based on the information supplied from the parallax detecting unit 43A and compares the calculated average of the parallaxes to the threshold value set by the system controller 21. The identification information generation unit 44 determines a section, at which the average of the parallaxes is greater than the threshold value, as a section at which both the L and R images are recorded. Moreover, identification information generation unit 44 determines a section, at which the average of the parallaxes is less than the threshold value, as a section at which one of the L and R images is recorded.

Based on the information supplied from the image quality detecting unit 43B, the identification information generation unit 44 determines the image with a higher image quality as a recording image between the L and R images at the section at which the parallax is small and determines the image with a lower image quality as an omission image therebetween. The identification information generation unit 44 generates identification information and outputs the identification information to the recording processing unit 42.

The recording capacity detecting unit 45 detects a vacant capacity of the recording medium 24 and outputs information regarding the vacant capacity to the system controller 21.

Figure 6:
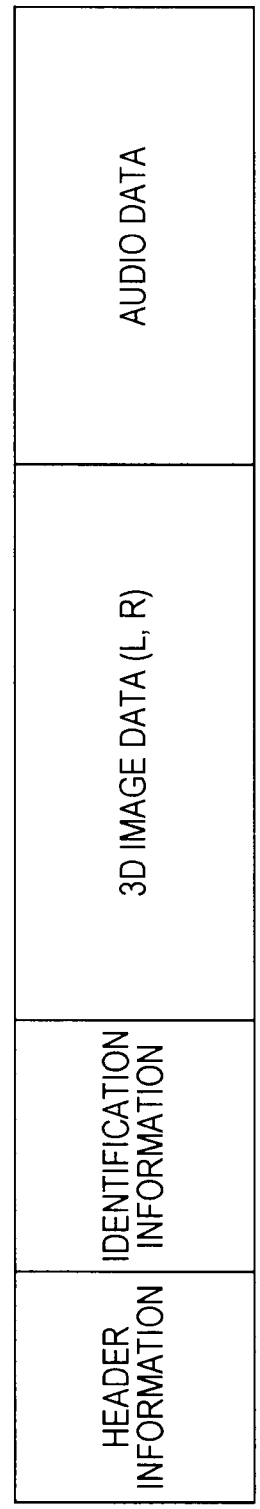
FIG. 6 is a diagram illustrating the data structure of information recorded in a recording medium.

FIG. 6 is a diagram illustrating the data structure of the information recorded in the recording medium 24.

The information regarding the 3D contents recorded in the recording medium 24 includes header information, identification information, image data, and audio data. For example, the information regarding the 3D contents having the structure shown in FIG. 6 is recorded at each section at which the entirety of the 3D contents is demarcated by a predetermined number.

As shown in FIG. 6, information including the identification information is information regarding the section at which the parallax is small and one of the L and R images is recorded. The information of the section at which the parallax is large and both the L and R images are recorded includes no identification information.

Figure 7:
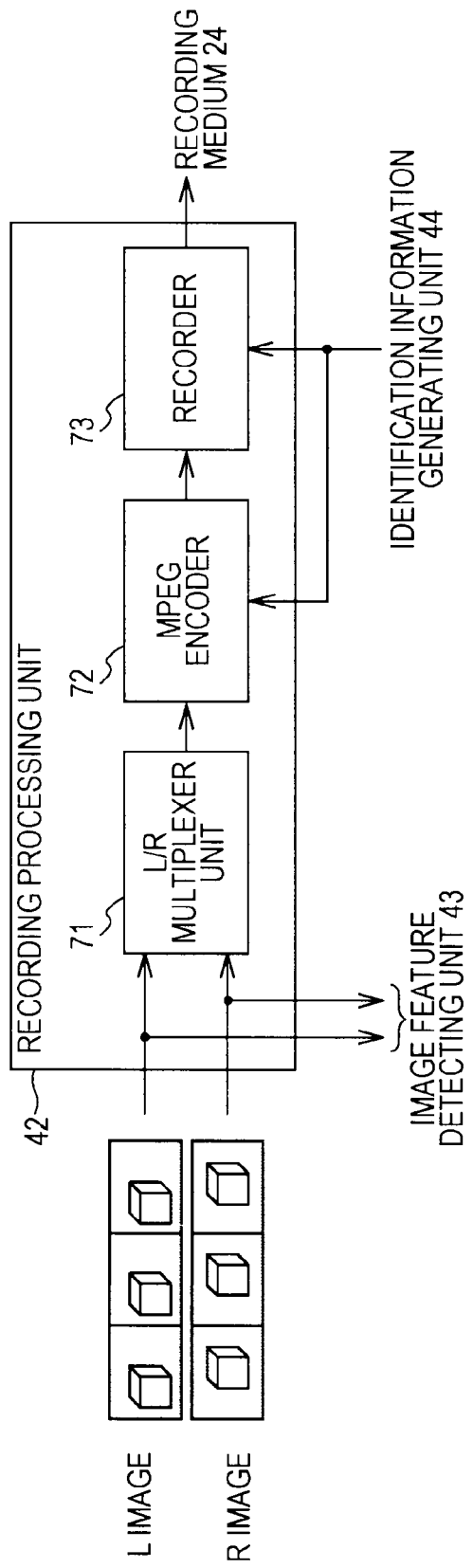
FIG. 7 is a block diagram illustrating an example of the configuration of a recording processing unit.

FIG. 7 is a block diagram illustrating an example of the configuration of the recording processing unit 42.

The recording processing unit 42 includes an L/R multiplexer 71, an MPEG2 encoder 72, and a recorder 73. Data of the frames of the L and R images are input to the L/R multiplexer 71. Here, the MPEG2 encoder 72 may be replaced by an H.264/AVC encoder which does not correspond to MVC (Multiview Video Coding) (the same is applied to the following description).

The L/R multiplexer 71 multiplexes the L and R images by attaching the L and R images to the same frame.

Figure 8A:
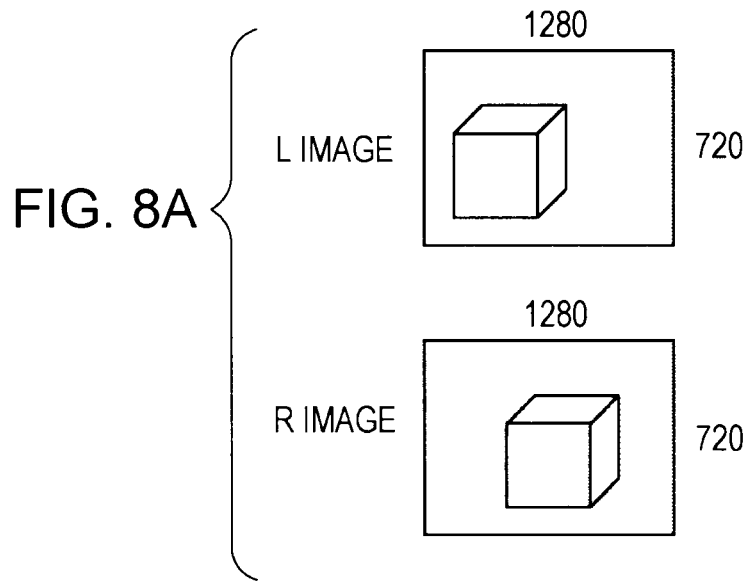
FIGS. 8A to 8C are diagrams illustrating examples of the multiplexing of L and R images.
Figure 8B:
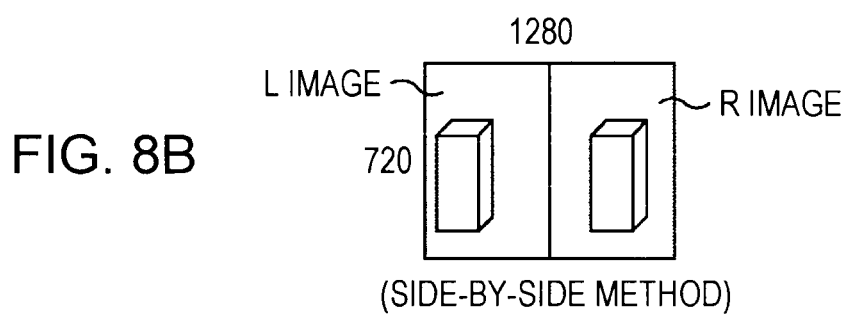

FIGS. 8A and 8B are diagrams illustrating examples of the multiplexing of the L and R images.

When the L/R multiplexer 71 multiplexes the L and R images in accordance with a Side-by-Side method, the L and R images shown in FIG. 8A can be attached to the left and right frames, as shown in FIG. 8B. In the examples of FIGS. 8A and 8B, the size of one frame is 1280×720 pixels. The L and R images with 1280×720 pixels are each thinned out by the half of the number of pixels in the horizontal direction, and then can be attached to the left and right of one frame.

Figure 8C:
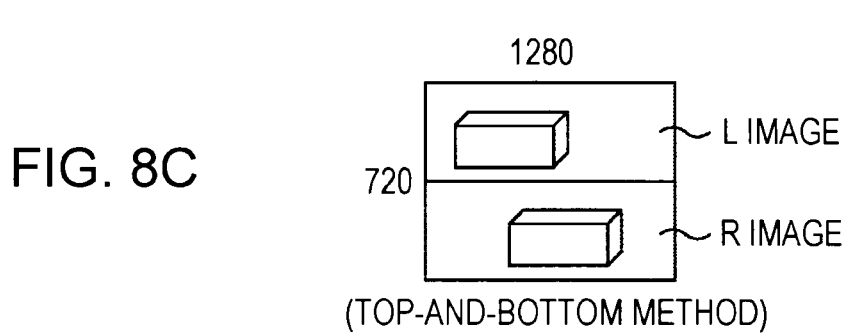

When the L/R multiplexer 71 multiplexes the L and R images in accordance with a Top-and-Bottom method, the L and R images shown in FIG. 8A can be attached to the top and bottom of one frame, as shown in FIG. 8C. The L and R images with 1280×720 pixels are each thinned out by half of the number of pixels in the vertical direction, and then can be attached to the top and bottom of one frame.

The L/R multiplexer 71 outputs each frame obtained by multiplexing the L and R images in this manner to the MPEG2 encoder 72.

The MPEG2 encoder 72 compresses the data of each frame obtained by multiplexing the L and R images by the L/R multiplexer 71 in accordance with, for example, the MPEG2 method.

At this time, when the L and R images attached to the frame to be compressed are the images at the section at which the parallax is large, the MPEG2 encoder 72 compresses the frame to which both the L and R images are attached.

Moreover, when the L and R images attached to the frame to be compressed are the images at the section at which the parallax is small, the MPEG2 encoder 72 specifies the image to be omitted between the L and R images attached to the frame based on the identification information generated by the identification information generating unit 44. The MPEG2 encoder 72 omits the specified image and compresses the frame to which only the recording image is attached.

Figure 9A:
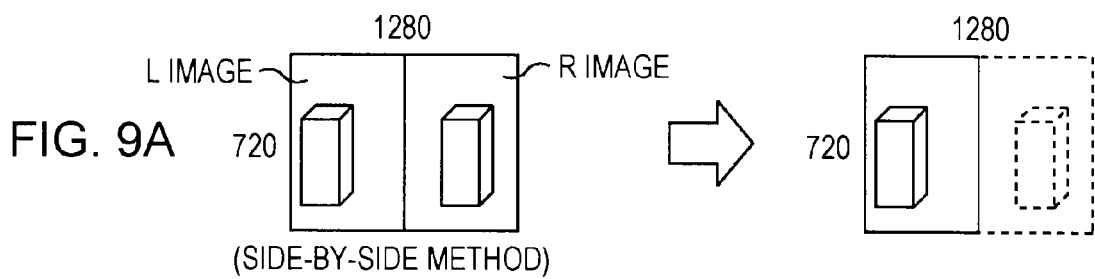
FIGS. 9A and 9B are diagrams illustrating examples of omitting of the images.
Figure 9B:
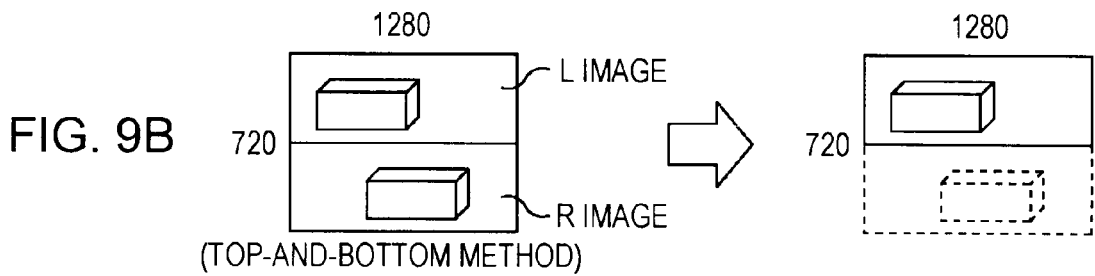

FIGS. 9A and 9B are diagrams illustrating examples of omission of an image.

FIG. 9A shows an example in which the multiplexing of the L and R images is performed in accordance with the Side-by-Side method. When the L and R images being multiplexed to the frame to be compressed are images at which the parallax is small and, for example, the R image is omitted, the MPEG2 encoder 72 omits the R image which can be attached to the right half of the frame, as indicated by a white arrow.

In FIGS. 9A and 9B, the R image indicated by a dashed line between the L and R images attached to the same frame is the R image omitted. The omitting of the R image is performed, for example, by setting the right half to which the R image is attached in the entire frame to be compressed to be an area of black data (Y=d'16, Cb=d'128, and Cr=d'128) or by setting the right half to be an area of 0 data.

FIG. 9B shows an omission example in which the multiplexing of the L and R images is performed in accordance with the Top-and-Bottom method. When the L and R images being multiplexed to the frame to be compressed are images at which the parallax is small and, for example, the R image is omitted, the MPEG2 encoder 72 omits the R image which can be attached to the bottom half of the frame, as indicated by a white arrow.

The MPEG2 encoder 72 compresses the frame in which one image is omitted in the above-described manner in accordance with the MPEG2 or the like. When the area to which the omission image is attached is set to the area of the black data or the area of the 0 data, the data of the area is not substantially present. Therefore, the amount of the entire data of one frame is less than the entire data amount of one frame to which both the L and R images can be attached.

The MPEG2 encoder 72 outputs, to the recording unit 73, data which is obtained by compressing the frame to which both the L and R images can be attached or data which is obtained by compressing the frame to which one of the L and R images can be attached.

The data of each frame may not be compressed in accordance with the MPEG2 or the like, but may be recorded in a non-compressed state.

The recording unit 73 adds the header information to the identification information supplied from the identification information generating unit 44, the image data of the 3D contents formed from each frame supplied from the MPEG2 encoder 72, and the audio data. Then, the recording unit 73 records the information having the structure shown in FIG. 6 in the recording medium 24.

Next, the configuration of the reproducing side in the recording/reproducing apparatus 1 will be described.

The reproducing unit 25 includes a reproducing processing unit 51, an identification information analysis unit 52, an image data processing unit 53, and a display processing unit 54.

The reproducing processing unit 51 reads the information regarding the 3D contents to be reproduced from the recording medium 24. The reproducing processing unit 51 outputs the identification information to the identification information analysis unit 52, when the read information is information including the image data at the section at which the parallax is small and includes the identification information.

The reproducing processing unit 51 decompresses the compressed respective frames and outputs the L and R images extracted from the decompressed frames to the image data processing unit 53 and the display processing unit 54. When one of the L and R images is omitted, the black data or the 0 data which are the data of the recording image and the data of the omission image are output from the reproducing processing unit 51.

The identification information analysis unit 52 analyzes the identification information supplied from the reproducing processing unit 51 and specifies the image recorded between the L and R images and the parallax. The identification information analysis unit 52 outputs the analysis result to the image data processing unit 53.

The image data processing unit 53 performs the 2D-3D conversion to generate the omission image based on the L or R image which is the recording image, when the image at the section at which the parallax is small is supplied from the reproducing processing unit 51.

For example, the image data processing unit 53 generates the R image by setting the parallax in the L image, when the recording image supplied from the reproducing processing unit 51 is the L image. Moreover, the image data processing unit 53 generates the L image by setting the parallax in the R image, when the recording image supplied from the reproducing processing unit 51 is the R image. The image recorded as the recording image between the L and R images and the parallax used in the generation of the image are specified based on the analysis result of the identification information analysis unit 52.

The image data processing unit 53 outputs the recording image based on the generation of the image and the image generated based on the recording image, which serves as a basis of the generation of the image, to the display processing unit 54.

The display processing unit 54 alternately displays the L and R images on the TV 2 based on the data supplied from the reproducing processing unit 51 and the image data processing unit 53. For example, the display processing unit 54 displays the L and R images supplied from the reproducing processing unit 51, when the section to be reproduced is the section at which the parallax is large. Moreover, the display processing unit 54 displays the L and R images supplied from the image data processing unit 53, when the section to be reproduced is the section at which the parallax is small.

Figure 10:
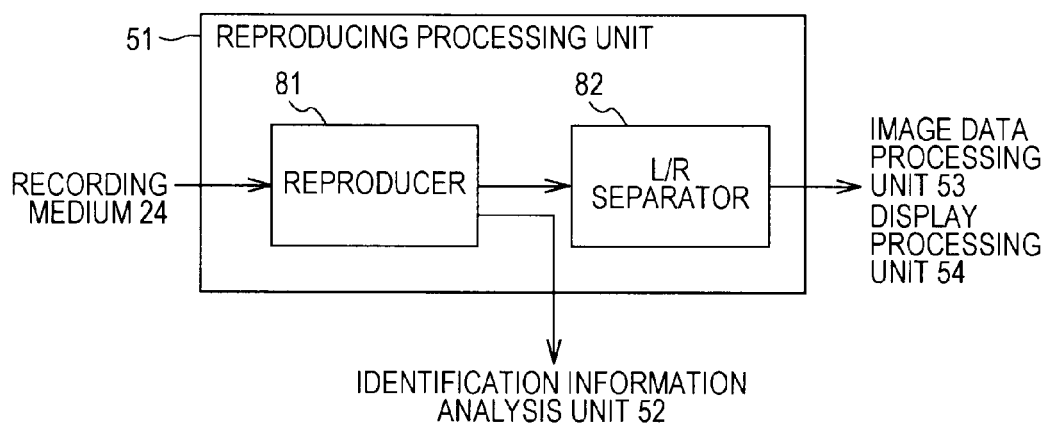
FIG. 10 is a block diagram illustrating an example of the configuration of a producing/processing unit.

FIG. 10 is a block diagram illustrating an example of the configuration of the reproducing processing unit 51.

The reproducing/processing unit 51 includes a reproducer 81 and an L/R separator 82.

The reproducer 81 outputs the identification information to the identification information analysis unit 52, when the information read from the recording medium 24 includes the identification information. Moreover, the reproducer 81 decompresses the compressed respective frames and outputs the decompressed frames to the L/R separator 82.

The L/R separator 82 separates the L and R images from the frames supplied from the reproducer 81 and outputs the L and R images to the image data processing unit 53 and the display processing unit 54.

Figure 11:
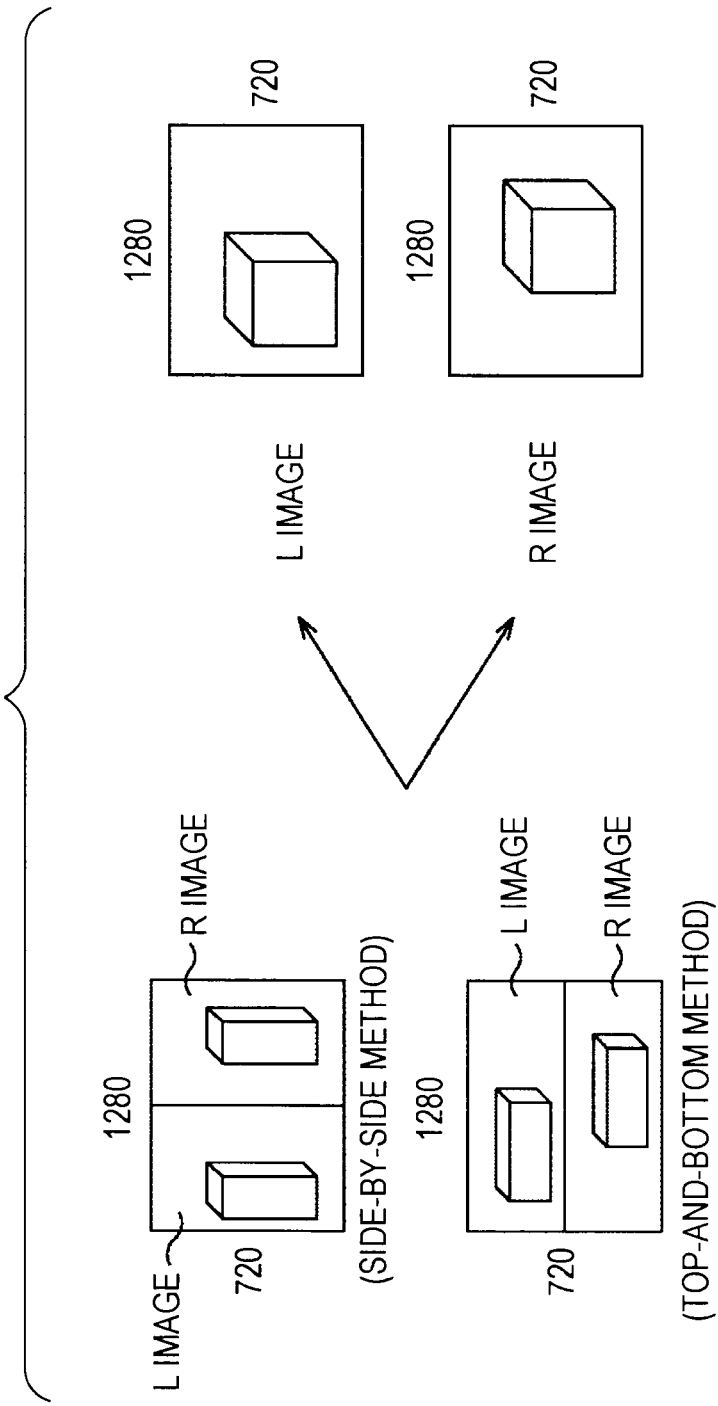
FIG. 11 is a diagram illustrating an example in which the L and R images are separated.

FIG. 11 is a diagram illustrating an example in which the L and R images are separated.

When the L and R images are multiplexed in accordance with the Side-by-Side method, as shown in the upper left part of FIG. 11, the L and R images are separated and extracted from the frames in which the L and R images are multiplexed. Moreover, the L and R images with the same number of pixels as the number of pixels of one frame shown in the right part of the drawing are generated by scaling the extracted L and R images.

When the L and R images are multiplexed in accordance with the Top-and-Bottom method, as shown in the lower left part of FIG. 11, the L and R images are separated and extracted from the frames in which the L and R images are multiplexed. Moreover, the L and R images with the same number of pixels as the number of pixels of one frame shown in the right part of the drawing are generated by scaling the extracted L and R images.

When the L or R image attached to the frame is omitted, the image which has the same number of pixels as the number of pixels of one frame and in which all of the pixel data are black data or 0 data is generated as data of the omission image.

The reproducer 81 outputs the L and R images generated in this manner to the image data processing unit 53 and the display processing unit 54.

Figure 12:
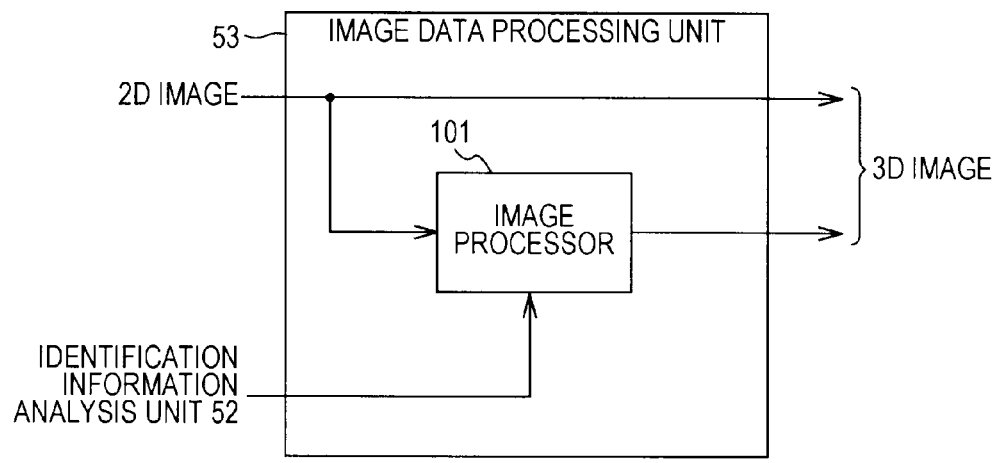
FIG. 12 is a block diagram illustrating an example of the configuration of an image data processing unit.

FIG. 12 is a block diagram illustrating an example of the configuration of the image data processing unit 53.

In the example of FIG. 12, the image data processing unit 53 includes an image processor 101. The data of the L or R image which is the recording image output from the reproducing processing unit 51 is input to the image processor 101 and is output to the display processing unit 54 without change.

The image processor 101 specifies the parallax used for generation of the image based on the analysis result of the identification information analysis unit 52 and generates the image by displacing the position of the object by the specified parallax. The image processor 101 outputs the generated image to the display processing unit 54.

When the image data input to the image data processing unit 53 shown in FIG. 12 and output to the display processing unit 54 without change is the data of the L image, the image data output from the image processor 101 is used as the data of the R image. Moreover, when the image data input to the image data processing unit 53 and output to the display processing unit 54 without change is the data of the R image, the image data output from the image processor 101 is used as the data of the L image.

Figure 13:
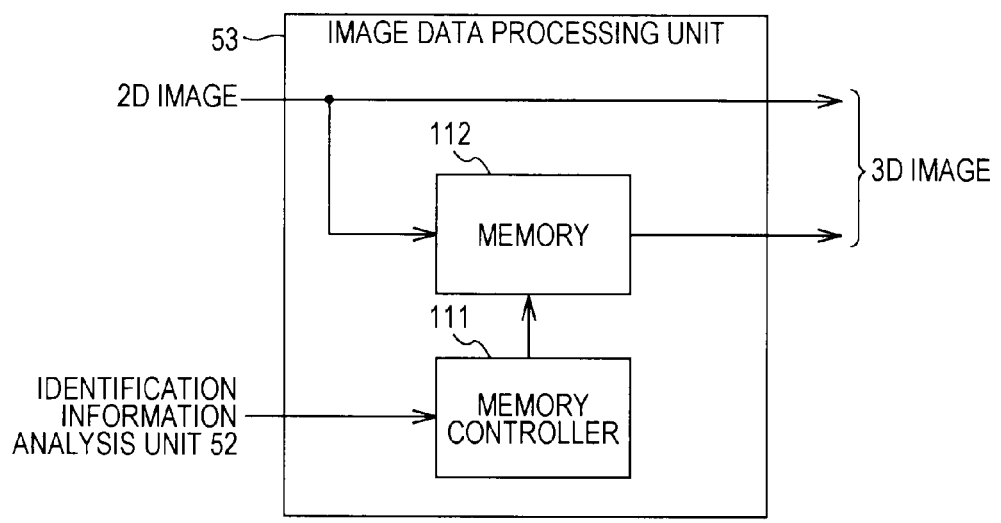
FIG. 13 is a block diagram illustrating an example of the configuration of an image data processing unit.

FIG. 13 is a block diagram illustrating another example of the configuration of the image data processing unit 53.

The image data processing unit 53 shown in FIG. 13 includes a memory controller 111 and a memory 112. The data of the L or R image which is the recording image output from the reproducing processing unit 51 is input to the memory 112 and is output to the display processing unit 54 without change.

The memory controller 111 specifies the parallax used for generation of the image based on the analysis result of the identification information analysis unit 52 and controls the amount of delay of the memory 112 based on the specified parallax. Information indicating a relationship between the parallax and the amount of delay is set in advance in the memory controller 111.

The memory 112 temporarily stores the input image data, delays the image data by the amount of delay corresponding to the parallax under the control of the memory controller 111, and outputs the image data.

When the image data input to the image data processing unit 53 shown in FIG. 13 and output to the display processing unit 54 without change is the data of the L image, the image data output from the memory 112 is used as the data of the R image. Moreover, when the image data input to the image data processing unit 53 and output to the display processing unit 54 without change is the data of the R image, the image data output from the memory 112 is used as the data of the L image.

Figure 14:
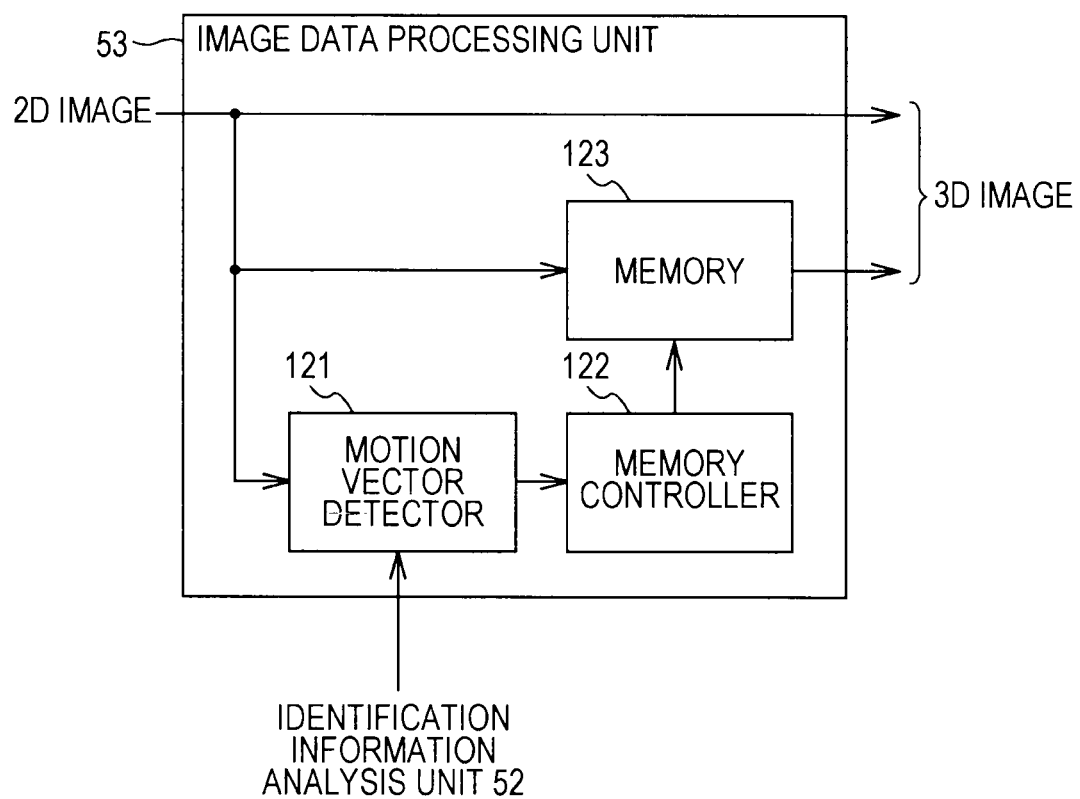
FIG. 14 is a block diagram illustrating an example of the configuration of an image data processing unit.

FIG. 14 is a block diagram illustrating still another example of the configuration of the image data processing unit 53.

The image data processing unit 53 shown in FIG. 14 includes a motion vector detector 121, a memory controller 122, and a memory 123. The data of the L or R image which is the recording image output from the reproducing processing unit 51 is input to the motion vector detector 121 and the memory 123 and is output to the display processing unit 54 without change.

The motion vector detector 121 detects a motion vector indicating a motion between the frames based on the input image data, when the section to be reproduced is specified as the section at which the parallax is small based on the analysis result of the identification information analysis unit 52. For example, the motion vector detector 121 detects the motion vector in each of an area formed by separating one frame by a predetermined number and supplies the detection result to the memory controller 122.

The memory controller 122 controls the amount of delay of the memory 123 based on the motion vector detected by the motion vector detector 121. Information indicating a relationship between the motion vector and the amount of delay is set in advance in the memory controller 122.

The memory 123 temporarily stores the input image data, delays the image data by the amount of delay corresponding to the parallax under the control of the memory controller 122, and outputs the image data.

When the image data input to the image data processing unit 53 shown in FIG. 14 and output to the display processing unit 54 without change is the data of the L image, the image data output from the memory 123 is used as the data of the R image. Moreover, when the image data input to the image data processing unit 53 and output to the display processing unit 54 without change is the data of the R image, the image data output from the memory 123 is used as the data of the L image.

When viewing the L and R images obtained through the 2D-3D conversion in the configuration shown in FIG. 13 or 14, users can stereoscopically feel an object due to a time difference between the left and right images. There is known the Mach-Dvorak phenomenon as a phenomenon similar to the phenomenon in which the users stereoscopically feel an object due to the time difference between the left and right images. The time difference between displays of the L and R images becomes a parallax.

The configuration shown in FIG. 14 can be used even when the identification information includes no information regarding a parallax. The configuration shown in FIG. 14 is disclosed in, for example, Japanese Unexamined Patent Application Publication No. 8-149512.

Processing of Recording/Reproducing Apparatus

Figure 15:
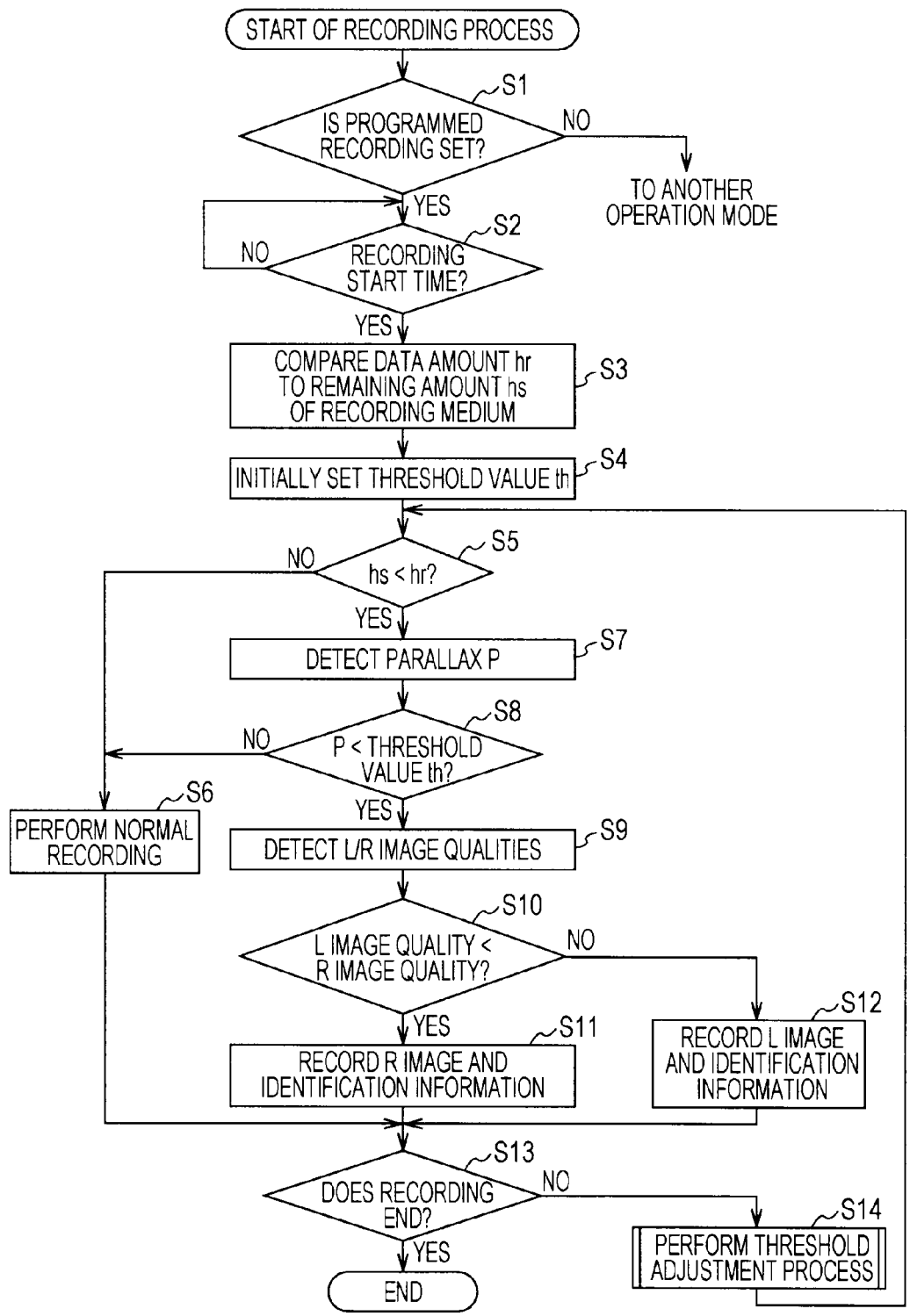
FIG. 15 is a flowchart illustrating a recording process of the producing/processing unit.

Next, the processing of the recording/reproducing apparatus 1 will be described with reference to the flowchart of FIG. 15. Processing on the image data in the processing described with reference to FIG. 15 is performed in sequence by switching the sections to be processed from the section of the head of the 3D contents.

In step S1, the system controller 21 determines whether the programmed recording is set. When the system controller 21 determines that the programmed recording is not set, another processing is performed. Here, the recording of the 3D contents described above is configured to be performed when the 3D contents is recorded in accordance with the programmed recording set by the user or automatically set by the recording/reproducing apparatus 1.

On the other hand, when the system controller 21 determines that the programmed recording is set in step S1, the system controller 21 determines whether the recording start time of the 3D contents in which the programmed recording is set comes in step S2. The system controller 21 waits until the system controller 21 determines that the recording start time comes.

When the system controller 21 determines that the broadcasting start time of the 3D contents comes and the recording start time comes in step S2, the system controller 21 compares the data amount hr of the 3D contents to be recorded to the remaining amount (vacant capacity) hs of the recording medium 24 in step S3. The system controller 21 calculates the data amount hr of the 3D contents based on a broadcasting time and a recording rate of the 3D contents specified by, for example, EPG (Electronic Program Guide) data. The remaining amount hs of the recording medium 24 is detected by the recording capacity detecting unit 45.

In step S4, the system controller 21 initially sets a threshold value th used for the comparison to the parallax between the L and R images.

In step S5, the system controller 21 determines whether the remaining amount hs of the recording medium 24 is less than the data amount hr of the 3D contents based on the comparison result of step S3.

When the system controller 21 determines that the remaining amount hs of the recording medium 24 is greater than the data amount hr of the 3D contents in step S5, the system controller 21 performs normal recording in step S6. During the normal recording, the L and R images are multiplexed into one frame without omission of the image, are compressed, and then are recorded in the recording medium 24.

On the other hand, when the system controller 21 determines that the remaining amount hs of the recording medium 24 is less than the data amount hr of the 3D contents in step S5, the parallax detecting unit 43A of the image feature detecting unit 43 detects a parallax p between the L and R images in step S7.

In step S8, the identification information generating unit 44 determines whether the parallax p between the L and R images is less than the threshold value th. When the identification information generating unit 44 determines that the parallax p between the L and R images is greater than the threshold value th, the process proceeds to step S6. Then, the normal recording, that is, recording both the L and R images is performed.

On the other hand, when the identification information generating unit 44 determines that the parallax p between the L and R images is less than the threshold value th in step S8, the image quality detecting unit 43B detects the image qualities of the L and R images at the section to be recorded in step S9.

In step S10, the identification information generating unit 44 determines whether the image quality of the L image is lower than that of the R image.

When the identification information generating unit 44 determines that the image quality of the L image is lower than that of the R image in step S10, the R image and the identification information are recorded in step S11. That is, the identification information generating unit 44 omits the L image and determines the R image as the recording image. Then, the identification information generating unit 44 generates the identification information including information indicating that the R image is recorded and information indicating the parallax. The recording processing unit 42 omits the L image based on the identification information generated by the identification information generating unit 44, compresses data of the frame attached with only the R image, and then records the data of the frame together with the identification information or the like in the recording medium 24.

When the identification information generating unit 44 determines that the image quality of the L image is better than that of the R image in step S10, the L image and the identification information are recorded in step S12. That is, the identification information generating unit 44 omits the R image and determines the L image as the recording image. Then, the identification information generating unit 44 generates the identification information including information indicating that the L image is recorded and information indicating the parallax. The recording processing unit 42 omits the R image based on the identification information generated by the identification information generating unit 44, compresses data of the frame attached with only the L image, and then records the data of the frame together with the identification information or the like in the recording medium 24.

After one of the L and R images is recorded in step S11 or S12 or after both of the L and R images are recorded in step S6, the system controller 21 determines whether the programmed recording ends in step S13.

When the system controller 21 determines that the programmed recording does not end, for example, due to the fact that the broadcasting still continues in step S13, the system controller 21 performs a threshold value adjustment process in step S14. In the threshold adjustment process, the threshold value th used to be compared to the parallax is appropriately updated. Thereafter, the process returns to step S5 to repeat the same processes on the subsequent section.

On the other hand, when the system controller 21 determines that the programmed recording ends in step S13, the system controller 21 controls the recording processing unit 42 to stop the programmed recording and terminate the recording.

Figure 16:
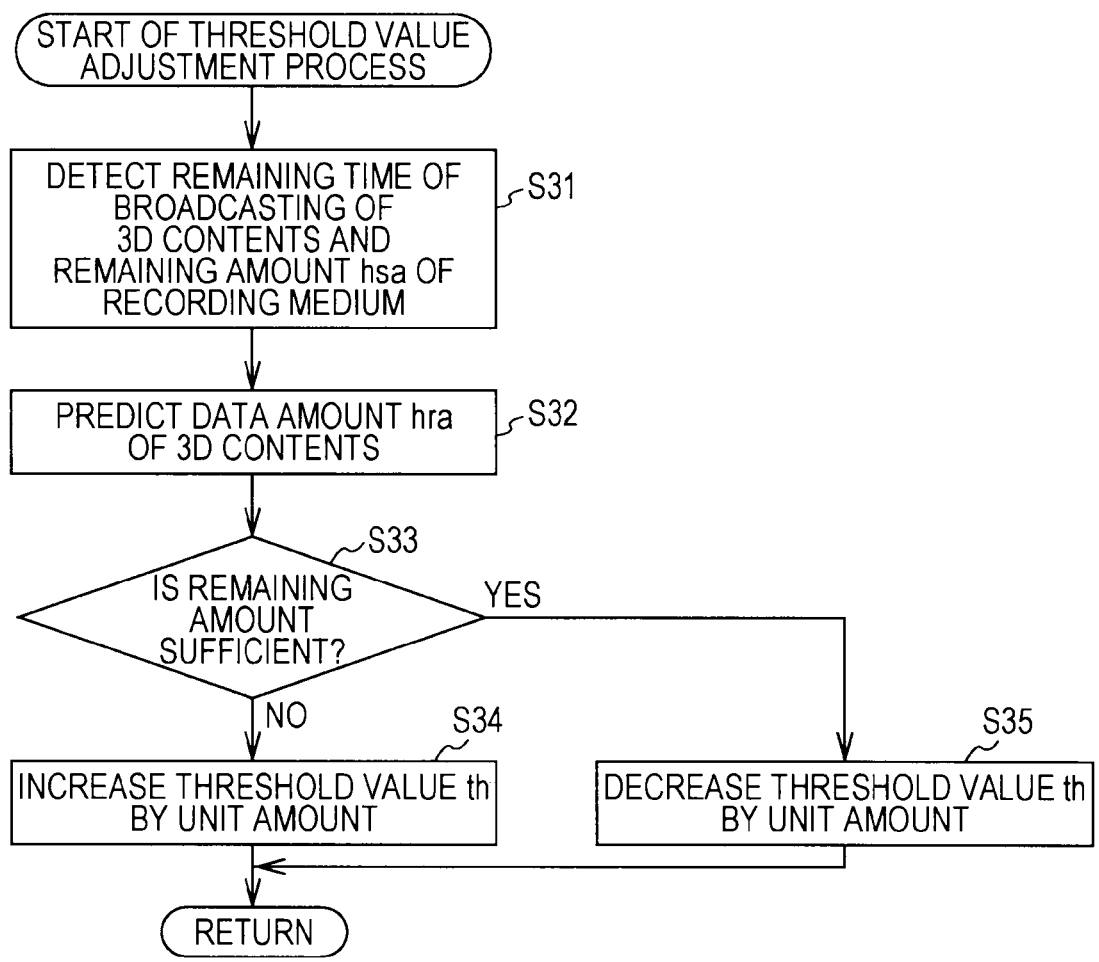
FIG. 16 is a flowchart illustrating a threshold value adjustment process performed in step S14 of FIG. 15.

The threshold value adjustment process performed in step S14 of FIG. 15 will be described with reference to the flowchart of FIG. 16.

In step S31, the system controller 21 detects the remaining time of the broadcasting of the 3D contents to be recorded and detects the remaining amount hsa of the recording medium 24 based on the information supplied from the recording capacity detecting unit 45.

In step S32, the system controller 21 predicts a data amount hra of a part which is not yet recorded in the 3D contents. The system controller 21 calculates the data amount hra of the part which is not yet recorded in the 3D contents based on, for example, the remaining time detected in step S31 and the recording rate. The system controller 21 compares the predicted data amount hra of the 3D contents to the remaining amount hsa of the recording medium 24.

In step S33, the system controller 21 determines whether the remaining amount hsa of the recording medium 24 is sufficient.

When the system controller 21 determines that the data amount hra of the 3D contents is greater than the remaining amount hsa of the recording medium 24 and thus the remaining amount hsa of the recording medium 24 is not sufficient in step S33, the system controller 21 increases and sets the threshold value th by the unit amount in step S34. Thus, the number of omitted images is more than the number of images omitted before the setting of the threshold value th is changed. Therefore, the data amount necessary for recording the entirety of the 3D contents can be reduced.

On the other hand, when the system controller 21 determines that the data amount hra of the 3D contents is less than the remaining amount hsa of the recording medium 24 and thus the remaining amount hsa of the recording medium 24 is sufficient in step S33, the system controller 21 decreases and sets the threshold value th by the unit amount in step S35. Thus, the number of omitted images is decreased before the setting of the threshold value th is changed. Therefore, the image quality of the 3D contents to be reproduced can be approximated to the image quality of the recorded 3D contents while the 3D contents is completely recorded.

After the threshold value th is updated in step S34 or S35, the process returns to step S14 of FIG. 15 to perform the subsequent processes.

The threshold value may be updated in accordance with another method.

Figure 17:
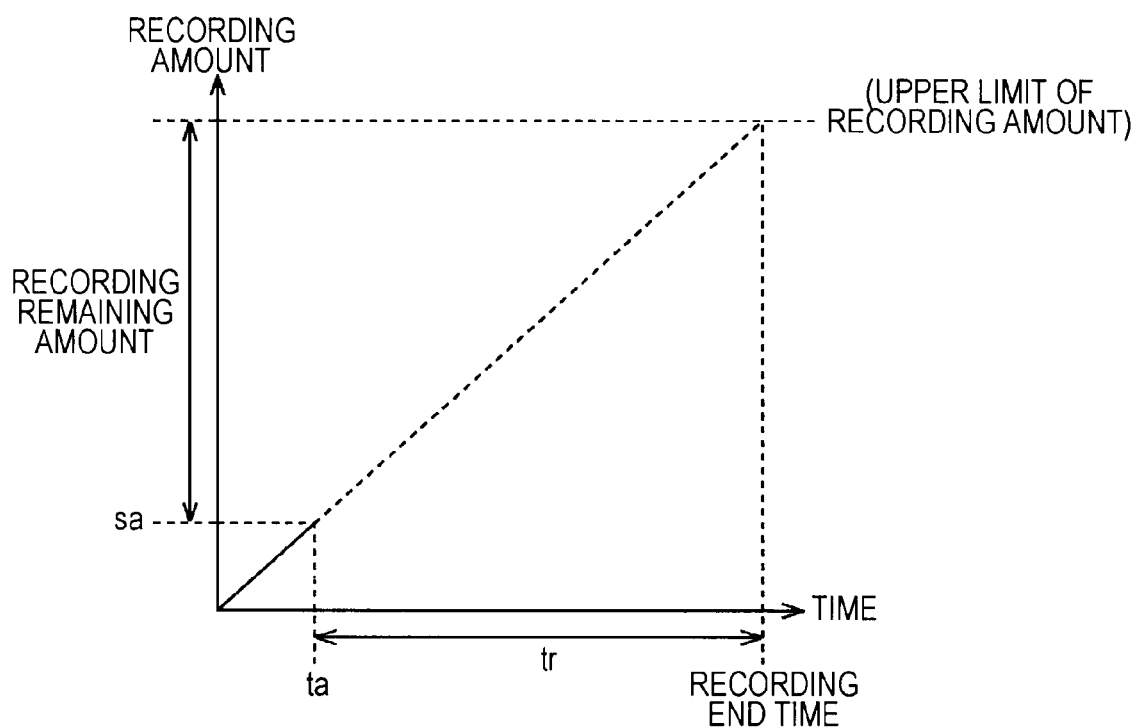
FIG. 17 is a diagram illustrating an example of prediction of the data amount of the 3D contents.

FIG. 17 is a diagram illustrating an example of a prediction of the data amount of the 3D contents.

In FIG. 17, the horizontal axis represents a time and the vertical axis represents the capacity of the recording medium 24. The recording start time is 0 and the current time is a time ta. A time from the time ta to a recording end time is a recording remaining time tr. The data amount of the recording medium 24 recorded at the time ta is a recording amount sa. An amount of the recording medium obtained by subtracting the remaining amount sa from the upper limit of the recording amount indicated by a dashed line is the remaining amount hsa of the recording medium 24.

For example, when the recording of the 3D contents continues during the recording remaining time tr by setting the recording amount per unit time to be the same as the recording amount per unit time from the time 0 to the time ta, the system controller 21 predicts how much data amount of the 3D contents is necessary at the recording end time. That is, when an increase ratio sa/ta of the recording amount is calculated from the current recording amount sa and it is assumed that the calculated increase ratio sa/ta continues during the recording remaining time tr, the data amount of 3D contents at the recording end time can be predicted.

When the predicated data amount exceeds the recording amount of the recording medium 24, it is determined that the capacity of the recording medium 24 is not sufficient, and thus the threshold value th is updated so as to be decreased. On the other hand, when the predicated data amount does not exceed the recording amount of the recording medium 24, it is determined that the capacity of the recording medium 24 is sufficient, and thus the threshold value th is updated so as to be increased.

Next, the reproducing process of the recording/reproducing apparatus 1 will be described with reference to the flowchart of FIG. 18.

Figure 18:
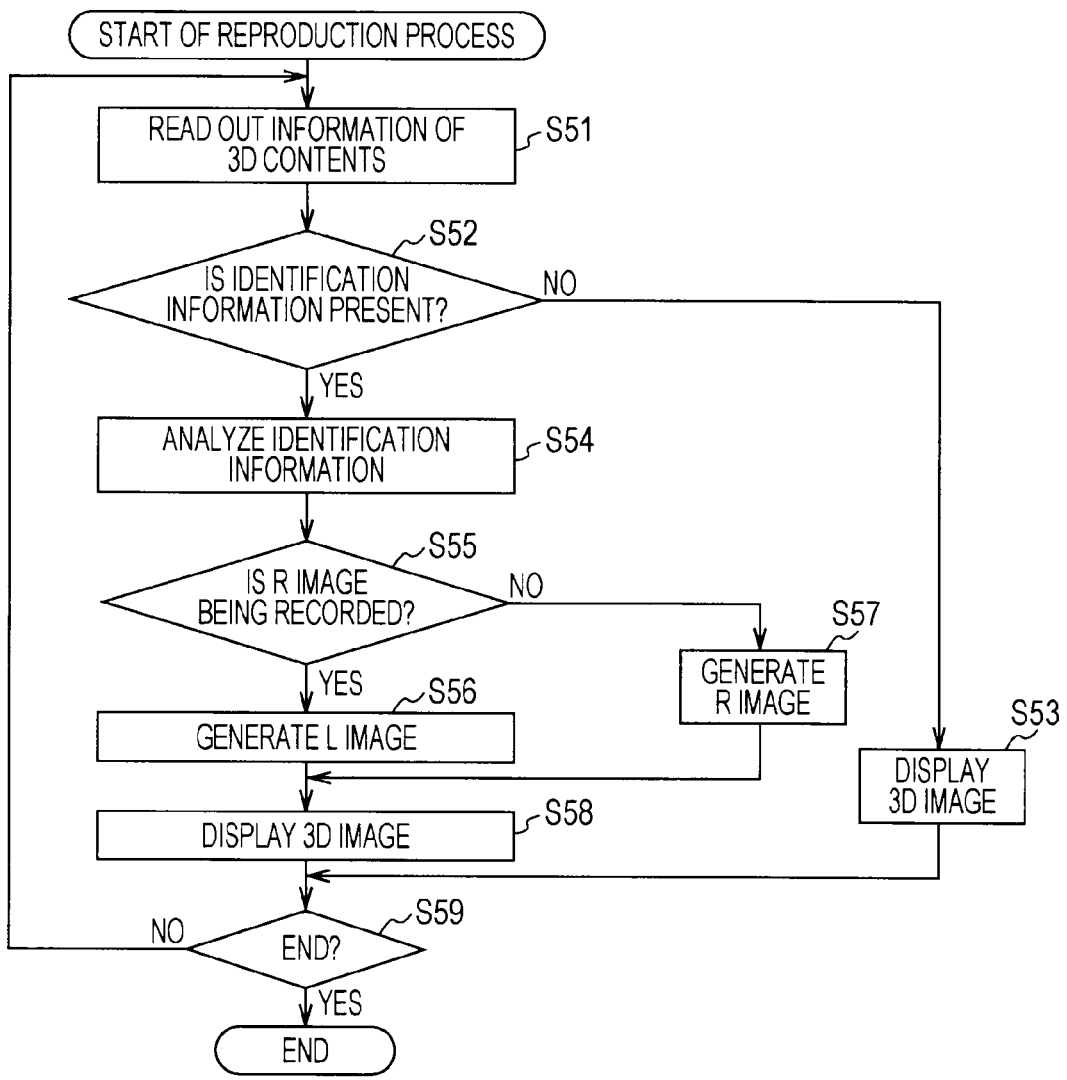
FIG. 18 is a flowchart illustrating a reproducing process of the recording/reproducing apparatus.

The processing of FIG. 18 starts when a predetermined 3D contents item is selected among the recorded 3D content items by operating the remote controller 31. For example, the processing of FIG. 18 is performed by switching the sections to be reproduced in sequence from the head section of the 3D contents.

In step S51, the reproducing processing unit 51 reads information of the section to be reproduced from the recording medium 24.

In step S52, the reproducing processing unit 51 determines whether the identification information is recorded in correspondence with the image data of the section to be reproduced.

When the reproducing processing unit 51 determines whether the identification information is not recorded in step S52, the 3D image is displayed in step S53. When no identification information is present, the section to be currently reproduced is the section in which the parallax is large and both the L and R images are recorded in this section. The L and R images obtained through the reproducing process in the reproducing processing unit 51 are supplied to the display processing unit 54 and are alternately display on the TV 2.

When the reproducing processing unit 51 determines whether the identification information is recorded in step S52, the identification information analysis unit 52 analyzes the identification information in step S54. When the identification information is recorded in correspondence with the image data of the section to be reproduced, the section to be currently reproduced is the section in which the parallax is small and one of the L and R images is recorded in this section.

In step S55, the image data processing unit 53 determines whether the data of the R image is recorded as the image data of the section to be reproduced based on the analysis result of the identification information analysis unit 52.

When the image data processing unit 53 determines that the data of the R image is recorded in step S55, the image data processing unit 53 performs the 2D-3D conversion to generate the L image based on the R image in step S56. The L image generated by the image data processing unit 53 is supplied together with the R image, which is the recording image, to the display processing unit 54.

On the other hand, the image data processing unit 53 determines that the data of the L image is recorded in step S55, the image data processing unit 53 performs the 2D-3D conversion to generate the R image based on the L image in step S57. The R image generated by the image data processing unit 53 is supplied together with the L image, which is the recording image, to the display processing unit 54.

In step S58, the display processing unit 54 displays the 3D image on the TV 2 based on the L and R images supplied from the image data processing unit 53.

After the 3D image is displayed in step S53 or S58, the system controller 21 determines whether the reproducing process ends in step S59. When the system controller 21 determines that the reproducing process does not end in step S59, the process returns to step S51 to repeat the same processes on the subsequent section. When the system controller 21 determines that the reproducing process ends in step S59, the reproducing process ends.

Figure 19:
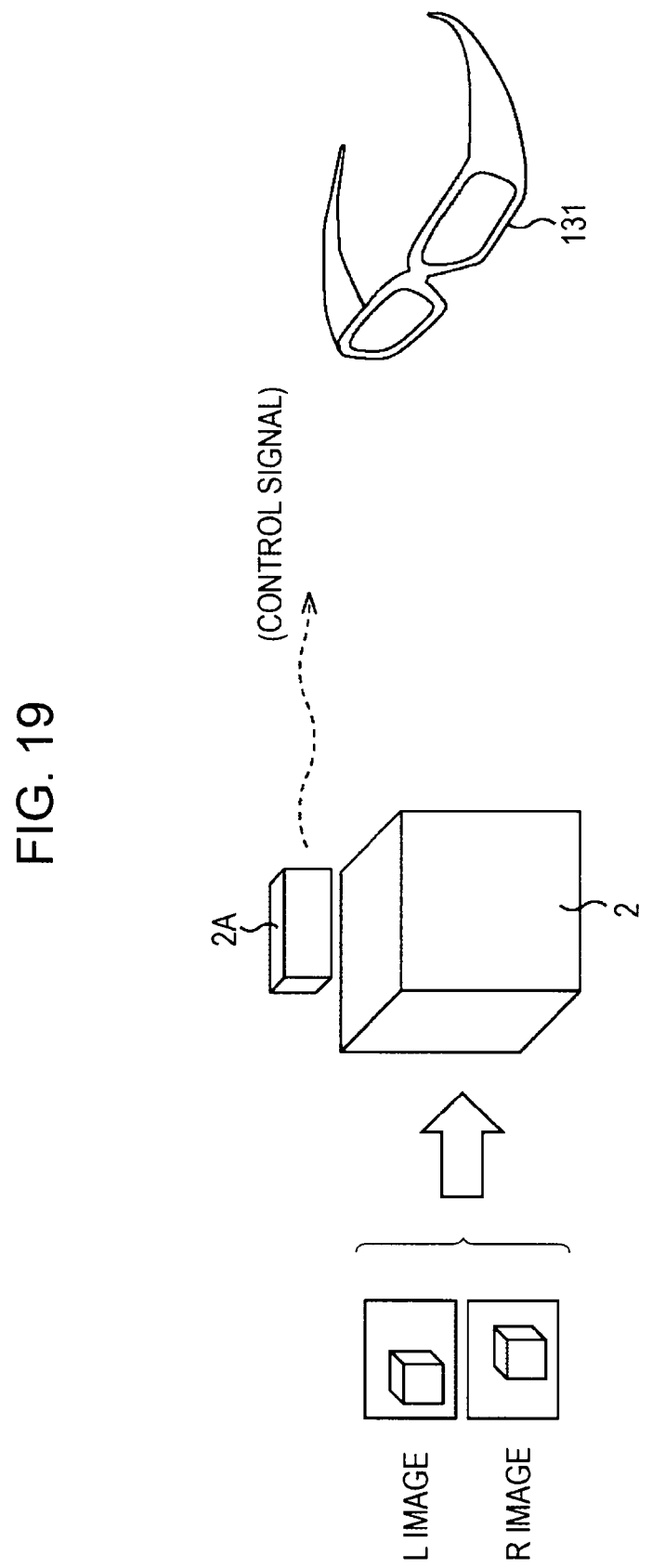
FIG. 19 is a diagram illustrating an example of viewing of a 3D image.

FIG. 19 is a diagram illustrating an example of viewing of a 3D image.

The L and R images displayed on the TV 2 are guided to the left eye and the right eye of the user wearing shutter glasses 131. The synchronization of the shutter glasses 131 is controlled in accordance with a control signal output using infrared light from the control unit 2A installed in the TV 2.

The recording/reproducing apparatus 1 can efficiently record the 3D contents in accordance with the above-described processes. For example, even when the recording is performed by the programmed recording, the recording/reproducing apparatus 1 can reliably record the entirety of the 3D contents.

Thus, the recording/reproducing apparatus 1 can efficiently reproduce the recorded 3D contents while appropriately generating the omitted images.

Modified Examples

As described above, the parallax between the L and R images is compared to the threshold value at each section. However, the section may be a section at which a plurality of pairs of L and R images is present or may be a section at which one pair of L and R images is present.

The process of comparing the parallax to the threshold value, appropriately omitting the image, and recording the image may be performed at the time of the recording other than the time at which the 3D contents is recorded in accordance with the programmed recording. Likewise, the above process may be performed not at the time of the recording but at the time of transmitting the 3D contents, when the parallax is compared to the threshold value, the image is appropriately omitted, and the image is transmitted.

When the parallax is less than the threshold value, as described above, the image qualities of the L and R images are detected and the image with the lower image quality is omitted. However, the image set in advance in the system controller 21 between the L and R images may be omitted. Thus, the image quality may not be detected. Moreover, instead of omitting the image at the time of the recording, a process of increasing a data compression ratio may be performed in the encoding process. For example, when the size of the image is halved for the encoding process, the size of the image may be returned to the original size at the time of the reproducing. Alternatively, instead of omitting the image, a recording bit rate may be lowered as another method.

Different apparatuses may execute the recording function and the reproducing function of the recording/reproducing apparatus 1, respectively. The recording apparatus having the recording function includes the system controller 21, the recording unit 23, and the recording medium 24 shown in FIG. 5. Moreover, the reproducing apparatus having the reproducing function includes the system controller 21 and the reproducing unit 25 shown in FIG. 5. The 3D contents recorded by the recording apparatus is supplied to the reproducing unit 25 of the reproducing apparatus via the recording medium or a network.

Example of Configuration of Computer

The series of processes described above may be executed by hardware or software. When the series of processes are executed by the software, a program constituting the software is installed from a program recording medium to a computer configured by a dedicated hardware apparatus, a general personal computer, or the like.

Figure 20:
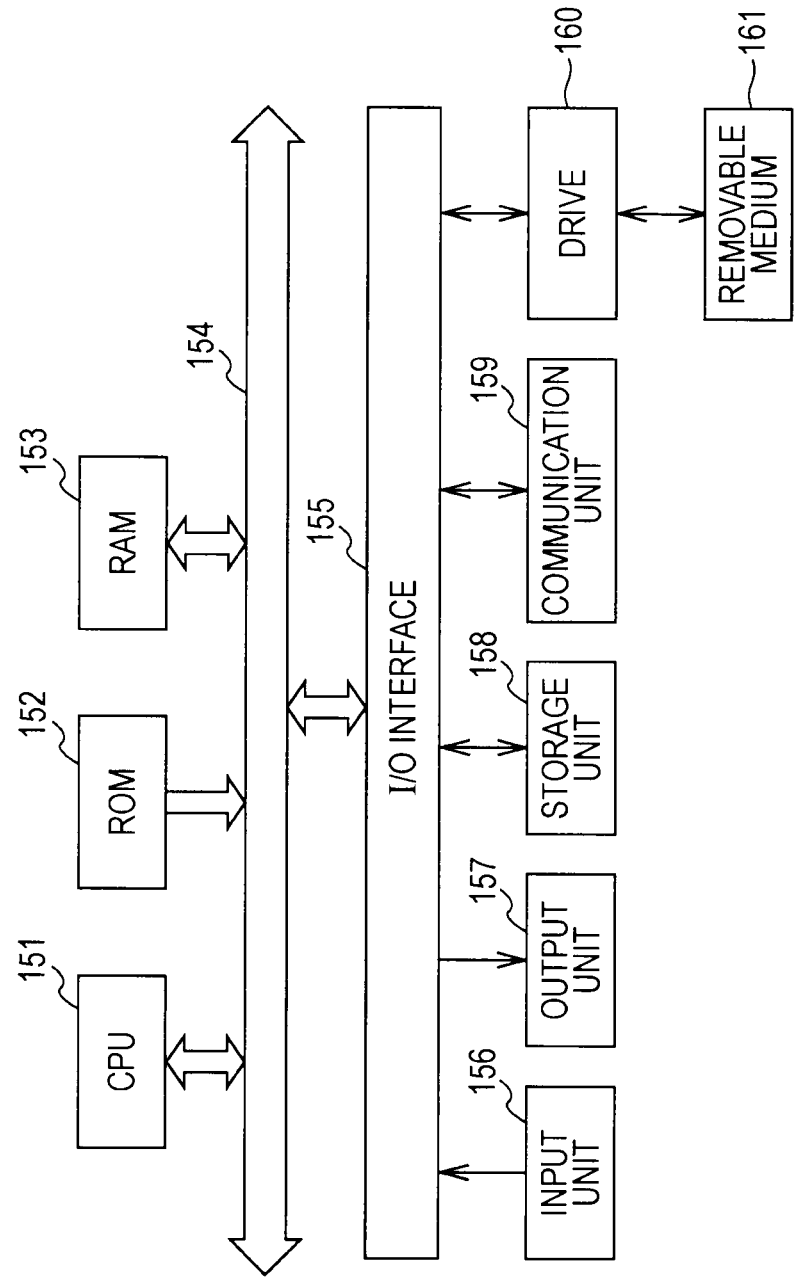
FIG. 20 is a block diagram illustrating an example of the configuration of a computer.

FIG. 20 is a block diagram illustrating an example of the hardware configuration of a computer that executes a program to perform the above-described series of processes.

A CPU (Central Processing Unit) 151, a ROM (Read-Only Memory) 152, and a RAM (Random Access Memory) 153 are connected to each other via a bus 154.

Moreover, an I/O interface 155 is connected to the bus 154. An input unit 156 including a keyboard and a mouse and an output unit 157 including a display and a speaker are connected to the I/O interface 155. Moreover, a storage unit 158 including a hard disk or a non-volatile memory, a communication unit 159 including a network interface, and a drive 160 driving a removable medium 161 are connected to the I/O interface 155.

In the computer having such a configuration, for example, the CPU 151 executes the above-described series of processes by loading and executing a program stored in the storage unit 158 on the RAM 153 via the I/O interface 155 and the bus 154.

The program executed by the CPU 151 is recorded in, for example, the removable medium 161 or is supplied via a wired or wireless transmission medium such as a local area network, the Internet, or digital broadcasting to be installed in the storage unit 158.

The program executed by the computer may be a program that is processed chronologically in the sequence described in the specification or a program that is processed in parallel or at a timing necessary when the program is called.

The present disclosure contains subject matter related to that disclosed in Japanese Priority Patent Application JP 2010-154791 filed in the Japan Patent Office on Jul. 7, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus comprising:
   circuitry configured to
   detect a parallax between L and R images included in 3D contents to be recorded; and
   record both of the L and R images of a first section of the 3D contents at which the parallax between the L and R images is greater than a threshold value to a medium and record one of the L and R images of a second section of the 3D contents at which the parallax between the L and R images is less than the threshold value to the medium,
   wherein the first and second sections recorded to the medium are reproducible together as the 3D contents.

2. The recording apparatus according to claim 1, wherein the circuitry is further configured to:
   detect image qualities of the L and R images, and
   record the image with the higher image quality between the L and R images in which the parallax is less than the threshold value.

3. The recording apparatus according to claim 1, wherein the circuitry is further configured to:
   generate identification information indicating which image is recorded between the L and R images, and
   record the identification information in correspondence with image data of the second section of the 3D contents.

4. The recording apparatus according to claim 3, wherein the circuitry is further configured to generate the identification information including information indicating the parallax between the L and R images.

5. The recording apparatus according to claim 1, wherein the circuitry is further configured to:
   compare a data amount of a part, which is not recorded in the entirety of the 3D contents, to a remaining capacity of a recording medium, in which the 3D contents is recorded, and update the threshold value so as to be higher, when the data amount of the part which is not recorded is greater than the remaining capacity of the recording medium.

6. A recording method comprising:
   detecting a parallax between L and R images included in 3D contents to be recorded; and
   recording both of the L and R images of a first section of the 3D contents at which the parallax between the L and R images is greater than a threshold value to a medium and recording one of the L and R images of a second section of the 3D contents at which the parallax between the L and R images is less than the threshold value to the medium,
   wherein the first and second sections recorded to the medium are reproducible together as the 3D contents.

7. A non-transitory medium storing a program causing a computer to execute a process including:
   detecting a parallax between L and R images included in 3D contents to be recorded; and
   recording both of the L and R images of a first section of the 3D contents at which the parallax between the L and R images is greater than a threshold value to a medium and recording one of the L and R images of a second section of the 3D contents at which the parallax between the L and R images is less than the threshold value to the medium,
   wherein the first and second sections recorded to the medium are reproducible together as the 3D contents.

* * * * *